(12) United States Patent  (10) Patent No.: US 9,508,170 B2
Kashibuchi et al.  (45) Date of Patent: Nov. 29, 2016

(54) IMAGE DISPLAY APPARATUS AND IMAGE DISPLAY METHOD

(71) Applicant: CANON KABUSHIKI KAISHA, Tokyo (JP)

(72) Inventors: Yoichi Kashibuchi, Kawasaki (JP); Masahito Yamamoto, Yokohama (JP); Hiroshi Sumio, Tokyo (JP); Motoki Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/791,590

(22) Filed: Mar. 8, 2013

(65) Prior Publication Data

US 2013/0235087 A1 Sep. 12, 2013

(30) Foreign Application Priority Data

Mar. 12, 2012 (JP) ................................. 2012-055003

(51) Int. Cl.
*G06T 11/60* (2006.01)
*G06K 9/00* (2006.01)

(52) U.S. Cl.
CPC ........... *G06T 11/60* (2013.01); *G06K 9/00456* (2013.01); *G06K 9/00463* (2013.01)

(58) Field of Classification Search
None
See application file for complete search history.

(56) References Cited

U.S. PATENT DOCUMENTS

| | | | |
|---|---|---|---|
| 2004/0006742 A1* | 1/2004 | Slocombe | 715/513 |
| 2006/0288278 A1* | 12/2006 | Kobayashi | 715/523 |
| 2007/0003139 A1* | 1/2007 | Gotoh et al. | 382/173 |
| 2007/0183661 A1* | 8/2007 | El-Maleh et al. | 382/173 |
| 2007/0229557 A1* | 10/2007 | Okumura et al. | 345/698 |
| 2009/0066730 A1* | 3/2009 | Mikawa | 345/661 |
| 2010/0171999 A1* | 7/2010 | Namikata et al. | 358/530 |
| 2012/0075331 A1* | 3/2012 | Mallick | G06T 11/001 345/594 |
| 2012/0092381 A1* | 4/2012 | Hoover et al. | 345/662 |
| 2012/0127207 A1* | 5/2012 | Matas et al. | 345/676 |
| 2012/0281119 A1* | 11/2012 | Ohba | H04N 9/8205 348/240.2 |

FOREIGN PATENT DOCUMENTS

| | | |
|---|---|---|
| CN | 101383141 A | 3/2009 |
| CN | 101739210 A | 6/2010 |
| CN | 102333146 A | 1/2012 |
| JP | 05-204369 A | 8/1993 |
| JP | 2004-139399 A | 5/2004 |
| JP | 4094512 B2 | 6/2008 |
| JP | 2010-109700 A | 5/2010 |
| JP | 2011-114401 A | 6/2011 |
| JP | 2011-186550 A | 9/2011 |
| KR | 10-2012-0006674 A | 1/2012 |

OTHER PUBLICATIONS

Wroblewski, Luke. "Touch Gesture Reference Guide". Feb. 2012.*

* cited by examiner

*Primary Examiner* — James A Thompson
(74) *Attorney, Agent, or Firm* — Canon USA, Inc. IP Division

(57) ABSTRACT

An image display apparatus for displaying an image containing a plurality of objects includes a setting unit configured to set a display magnification and a display position according to an attribute of a display target object when a first display mode for displaying each object included in the image is specified, and a display control unit configured to perform control to display on a screen the image containing the display target object based on the display magnification and the display position set by the setting unit.

30 Claims, 38 Drawing Sheets

FIG.8

BLOCK INFORMATION

| | ATTRIBUTE | X-COORDINATE | Y-COORDINATE | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 2 | X6 | Y6 | W6 | H6 | ABSENT |

\* ATTRIBUTE 1: TEXT, 2: PHOTOGRAPH, 3: GRAPHIC

INPUT FILE INFORMATION

| TOTAL NUMBER OF BLOCKS |
|---|
| N(=6) |

FIG.18

```
<?xml version="1.0"?>
<svg:svg xmlns:svg="http://www.w3.org/2000/svg" xmlns:xlink="http://www.w3.org/1999/xlink" xmlns:rcd
="http://www.canon.com/ns/rcd" width="606" height="862" viewBox="0 0 2361 3388">
```
*1801*

```
<svg:image x="0" y="0" width="1240" heigut="1760"
xlink:href="data:image/jpeg;base64,/9j/2wCEAB8VFxsXEx8bGRsjIR8kLk0yLioqLI5DRzhNb2J1c21ibGp7irGWe4OnhGpsmtGcp7a8
xsjGd5TZ6NfA5rHCxr4BISMjLiguWjlyWr5/bH++vr6+vr6+vr6+vr6+vr6+vr6+vr6+vr6+

FFABRQB//ZAAA=">
</svg:image>
```
*1802*

```
<svg:svg x="188" y="284" width="896" height="148" rcd:gType="stringText">
    <svg:text fill="#020202" font-size="150">
      <svg:tspan y="144" x="0 149 299 449 609 750">Taro Canon</svg:tspan>
    </svg:text>
</svg:svg>
```
*1803*

```
<svg:svg x="188" y="284" width="896" height="148" rcd:gType="vectorText">
    <svg:g fill="#020202">
        <path d=" M123.3,779h1.2c2.4,0 10.7,3.1 10.7,4v12h1.4q1.4,0 3.8,-1q2.4,-1 8.6,-4h1c3.5,0 8,2.8 8,5
        v2q-14,2 -20,2v3q0,3 2,6.6v2.4h2q2,0 6.9,-1.5q5,-1.5 12.1,-4.5h0.5c3.3,0 9.5,3.3 9.5,5
        c0,0.8 -23.6,6 -27,6h-1v3q7,22 7,23c0,0.8 -3.2,4 -4,4c-3.1,0 -4.9,-3.4 -6.8,-12.8c-1.4,-7 -2,-9.4 -3,-11.7
        q-0.2,-0.4 -0.2,-0.7v-2.4h-2q-2,0 -7.5,2.3q-5.5,2.2 -13,5.7c-3.2,0 -9.5,-6.7 -9.5,-10v-2h3
        q3.1,2.4 4.1,3.2q0.9,0.8 1.9,0.8c4,0 21,-5.7 21,-7q-2,-5 -2,-9v-1h-3q-3,0 -6.1,1.3q-3.2,1.3 -8.9,3.7
        h-0.5c-3.4,0 -9.5,-5.1 -9.5,-8c0,-1 1.3,-3 2,-3q3,3 5,3h4q10,-2 14,-2v-2.5c0,-3.8 -3.8,-10.5 -6,-10.5
        h-3v-1.5c0,-0.3 3,-3.5 3.3,-3.5z"/>
        <path d=" M199,781h1c2.4,0 9.6,2.2 9.6,3v15h3.2q3.2,0 11.1,-2q7.8,-2 16.1,-5c2.2,0 8,5.8 8,8v2
        h-5q0,0 0,0c-1,2.7 -23,2,18 -26,18h-1v2.5q5,18.5 5,21v0.5c0,1.2 -2.1,4 -3,4c-4.1,0 -5.2,-1.9 -6.8,-12.8
        c-2.1,-14.2 -3.6,-22.2 -5,-26.2q-0.2,-0.4 -0.2,-0.7v-2.4h-1.5q-1.5,0 -7.6,2.3q-6.2,2.3 -10.9,4.7c-2.9,0 -8,-6.1 -8,-9.5
        v-2.5h2q3.1,2.4 4.1,3.2q0.9,0.8 1.9,0.8q12,-3 18,-3v-3c0,-6.7 -3.4,-13 -7,-13h-2v-2
        c0,-1 2.7,-3 4,-3m34,19c-4,0 -21,4.9 -21,6q2,6 2,11h1.5c1.9,0 17.5,-14.2 17.5,-16v-1z"/>
        :
        :
    </svg:g>
</svg:svg>
```
*1804*

```
<svg:svg x="193" y= "631" width="311" height="205" rcd:gType="vectorLineArt">
    <svg:path fill="none" stroke="#000000" stroke-width="1.0" stroke-linecap="square"
        d="M1724,2367c-5.5,0 -15.2,12.3 -27,34c-8.2,15 -15,17.2 -79.1,24.5c-37.4,4.3 -63.9,10.1 -63.9,14q0,0.3 0.2,0.4c2.2,1.6
2.5,2.1 3.6,4.5
        c1.3,3.3 1.9,3.6 6.2,3.6h2q2,0 3.5,2c0.3,0 1.5,-1.2 1.5,-1.5c0,-0.3 3.1,-1.5 4,-1.5q2,0 2.5,0.5q0,0.5 0,5 7.5,5.5
        h12c5.7,0 13,6.7 13,12c0,10.5 -16.3,23 -30,23h-4,0 -6.6,-1.5q-2.7,-1.5 -12.4,-10.5q-7,4 -9.5,4c-4.2,0 -12.3,-6.6 -12.3,-10
        v-11h-3.2c-5.4,0 -20,27.7 -20,38c0,2.8 3.6,5 8,5h140c4.9,0 12,-4.2 12,-7q0,-1 -3,-6
        v-3.5c0,-22.1 30.5,-49.5 55,-49.5q2.3,0 41,1.6q5,0.2 13.5,2.4q3.5,0 8.5,-2c23.2,0 54,27.9 54,49q0,4 -0.5,4.4
        q-0.5,0.3 -3.5,5.1c0,1.6 6.4,4.5 10,4.5h3.5c36,0 68.5,-5.7 68.5,-12c0,-31.1 -17.8,-49.1 -64,-64.5q-25.1,-8.4 -30.4,-12.5
        q-6.1,-4.8 -16.1,-24c-6.5,-12.5 -15.6,-21 -22.5,-21h-66v0z"/>
        :
</svg:svg>

</svg:svg>
```

FIG.21A

| EVENT NAME | TOUCH PRESS EVENT |
|---|---|
| TRANSMITTED INFORMATION | PRESS COORDINATE VALUES |
| | LATEST NUMBER OF COORDINATES |

FIG.21B

| EVENT NAME | SWIPE EVENT |
|---|---|
| TRANSMITTED INFORMATION | EVENT GENERATION COORDINATE VALUES |
| | MOVING DISTANCE |

FIG.21C

| EVENT NAME | PINCH-IN EVENT |
|---|---|
| TRANSMITTED INFORMATION | PINCH-IN CENTER COORDINATE VALUES |
| | PINCH-IN REDUCTION RATE |

FIG.21D

| EVENT NAME | PINCH-OUT EVENT |
|---|---|
| TRANSMITTED INFORMATION | PINCH-OUT CENTER COORDINATE VALUES |
| | PINCH-OUT ENLARGEMENT RATE |

FIG.21E

| EVENT NAME | 2-POINT SWIPE EVENT |
|---|---|
| TRANSMITTED INFORMATION | EVENT GENERATION COORDINATE VALUES |
| | MOVING DISTANCE |

FIG.21F

| EVENT NAME | ROTATE EVENT |
|---|---|
| TRANSMITTED INFORMATION | ROTATION CENTER COORDINATE VALUES |
| | ROTATIONAL ANGLE |

FIG.21G

| EVENT NAME | FLICK EVENT |
|---|---|
| TRANSMITTED INFORMATION | LATEST COORDINATE VALUES |
| | RELEASING SPEED |

FIG.21H

| EVENT NAME | TOUCH RELEASE EVENT |
|---|---|
| TRANSMITTED INFORMATION | RELEASING COORDINATE VALUES |
| | LATEST NUMBER OF COORDINATES |

FIG.21I

| EVENT NAME | DOUBLE-TAP EVENT |
|---|---|
| TRANSMITTED INFORMATION | LATEST COORDINATE VALUES |

FIG.21J

| EVENT NAME | SINGLE-TAP EVENT |
|---|---|
| TRANSMITTED INFORMATION | LATEST NUMBER OF COORDINATES |

FIG.21K

| EVENT NAME | LONG-TAP EVENT |
|---|---|
| TRANSMITTED INFORMATION | LATEST COORDINATE VALUES |

FIG.21L

| EVENT NAME | TOUCH-AND-HOLD EVENT |
|---|---|
| TRANSMITTED INFORMATION | LATEST COORDINATE VALUES |

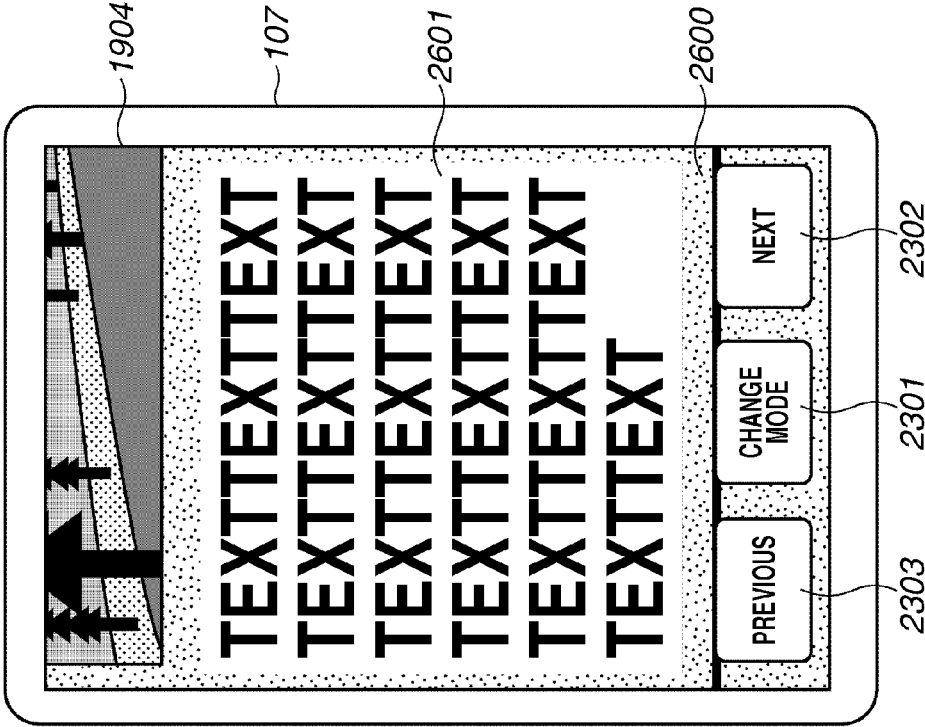
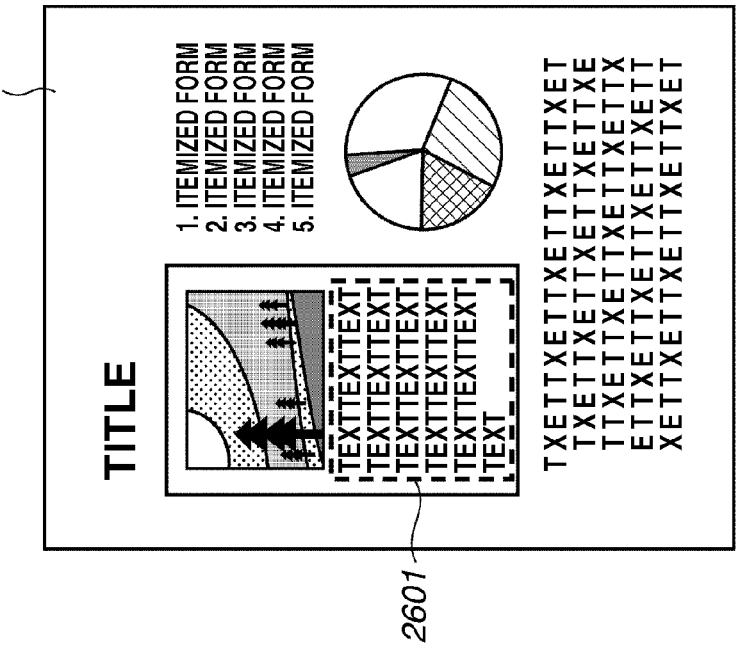

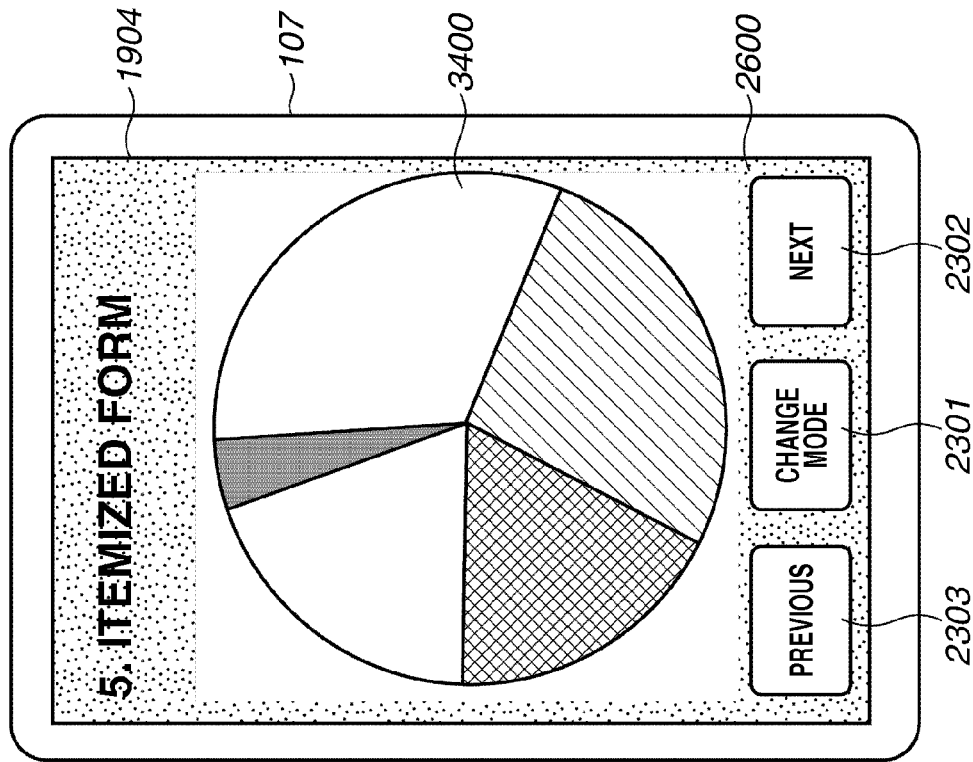
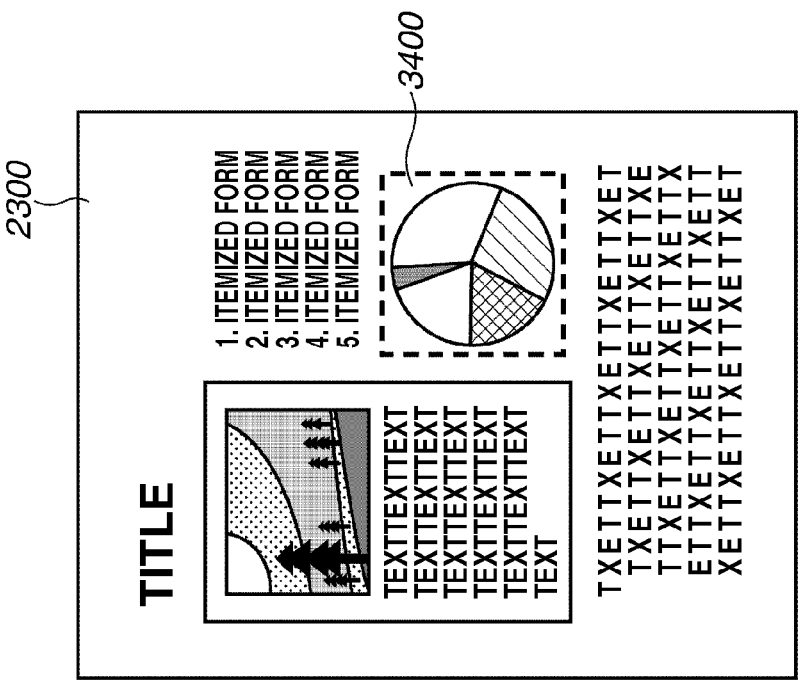

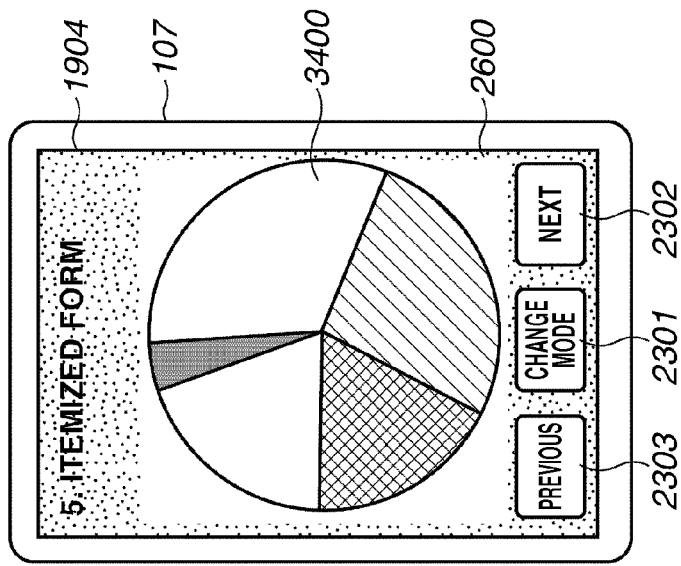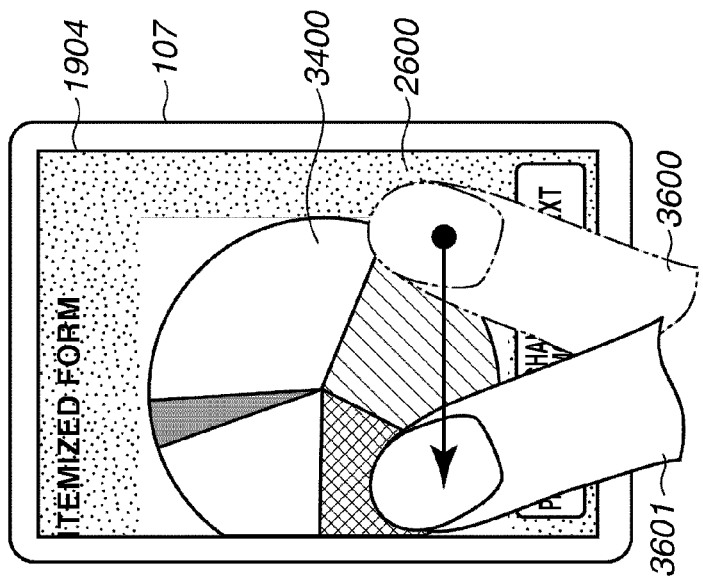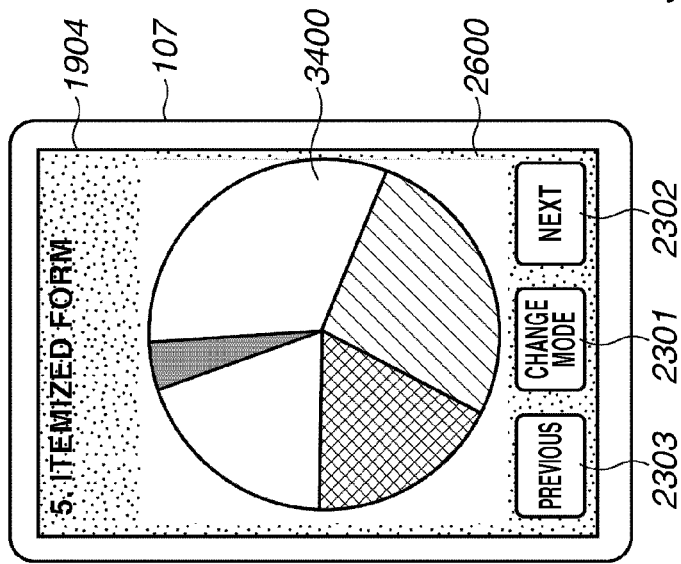

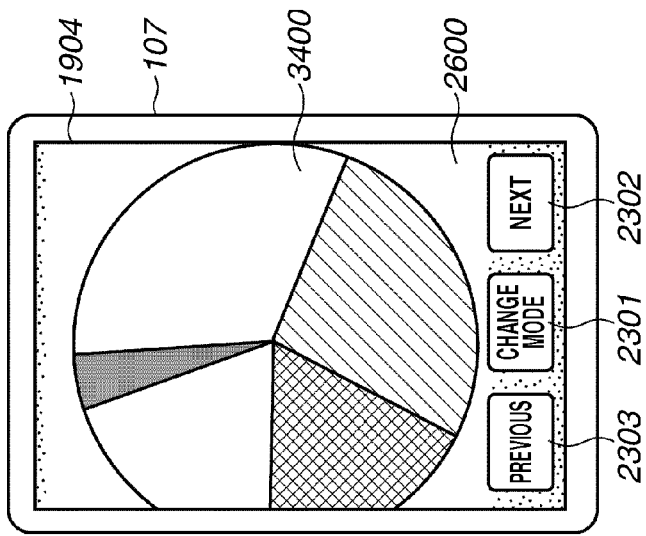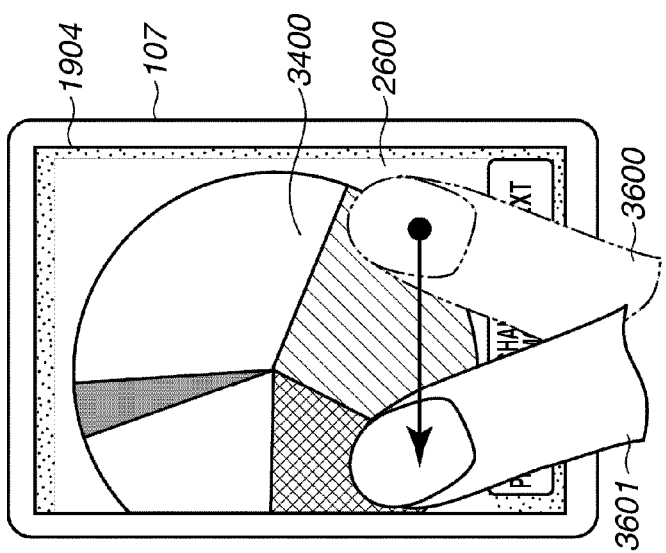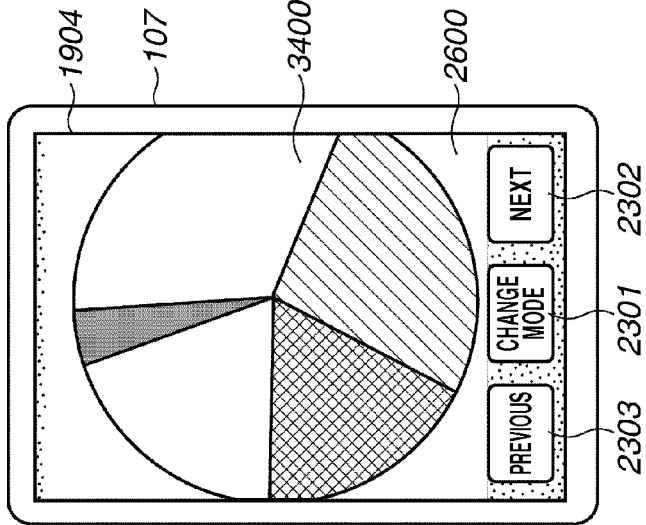

IMAGE DISPLAY APPARATUS AND IMAGE DISPLAY METHOD

BACKGROUND OF THE INVENTION

Field of the Invention

The present invention relates to an image display apparatus and an image display method suitable for viewing image data on a small screen.

Description of the Related Art

Conventionally, when displaying a document page image having a large number of pixels on a comparatively small image display apparatus, such as a personal computer, a personal digital assistant (PDA), a smartphone, a tablet computer, etc., respective portions of the page image are displayed in succession. An ordinary page image includes a plurality of portions composed of layout elements, such as paragraphs, headings, graphics, photographs, tables, and so on. To read a document, a user needs to repeat scrolling, enlarging, and reducing operations so that a desired portion of the page is displayed on the image display apparatus.

The user scrolls, enlarges, and reduces a display portion by operating an input apparatus, such as a switch, a wheel, a trackball, a joy stick, and a touch screen. In particular, many of image display apparatuses having a high-precision touch screen create a feeling of direct operation (direct manipulation), such as scrolling in the vertical, horizontal, and oblique directions through a swipe operation, enlargement through a pinch-out operation, and reduction through a pinch-in operation.

Japanese Patent No. 4094512 discusses a technique for sequentially displaying respective regions in document images on a screen with 100% magnification by two-dimensionally scrolling the screen according to the order of reading document images through a one-dimensional operation (right arrow key operation).

However, as a user sequentially reads images in a page by scrolling a display portion in a desired direction through a swipe operation, enlarging a display portion through a pinch-out operation, and reducing a display portion through a pinch-in operation, the size and position of the display portion needs to be fine-adjusted so that a display range desired by the user fits into the screen. This processing has been troublesome and complicated.

Since the technique discussed in Japanese Patent No. 4094512 sequentially displays respective regions with 100% magnification according to the order of reading in response to arrow key operations, the technique cannot adjust the display size of each region. The technique discussed in Japanese Patent No. 4094512 premises that a user performs operations by using arrow keys, and does not take into consideration a case where the user performs a swipe operation and enlarging and reducing operations.

SUMMARY OF THE INVENTION

According to an aspect of the present invention, an image display apparatus for displaying an image containing a plurality of objects includes a setting unit configured to set a display magnification and a display position according to an attribute of a display target object when a first display mode for displaying each object included in the image is specified, and a display control unit configured to perform control to display on a screen the image containing the display target object based on the display magnification and the display position set by the setting unit.

According to an exemplary embodiment of the present invention, a first display mode for displaying an object enables displaying each object on a screen in an easily viewable form according to the attribute of each object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates block information and input file information on each attribute when object segmentation is performed.

FIG. 18 illustrates an example of the Scalable Vector Graphics (SVG) format according to an exemplary embodiment of the present invention.

FIGS. 21A, 21B, 21C, 21D, 21E, 21F, 21G, 21H, 21I, 21J, 21K, and 21L illustrate names of gesture events and information to be transmitted when each event occurs.

FIGS. 26A and 26B illustrate example screen display of the touch UI of the PDA.

FIGS. 34A and 34B illustrate example screen display of the touch UI of the PDA.

FIGS. 35A, 35B, and 35C illustrate example screen display of the touch UI of the PDA.

FIGS. 36A, 36B, and 36C illustrate example screen display of the touch UI of the PDA.

DESCRIPTION OF THE EMBODIMENTS

Various exemplary embodiments, features, and aspects of the invention will be described in detail below with reference to the drawings.

Figure 1:
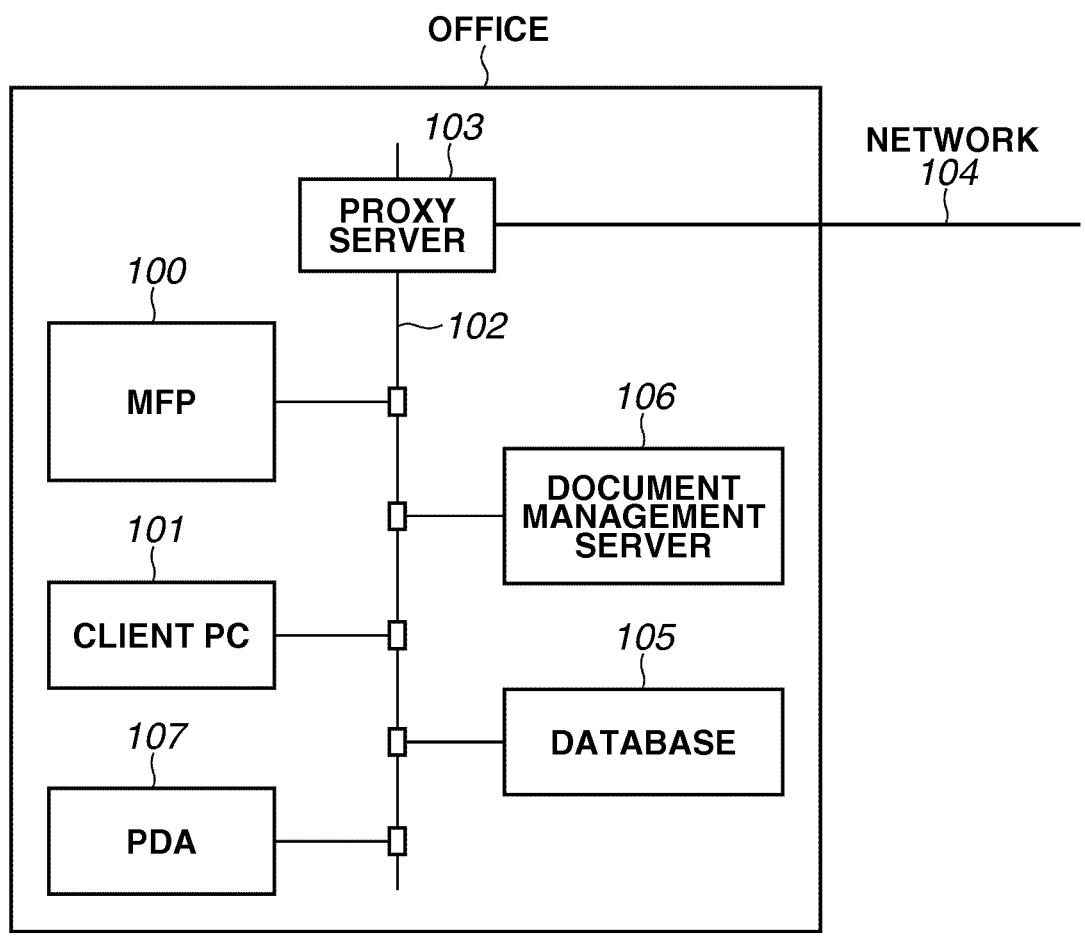
FIG. 1 is a block diagram illustrating an image processing system according to a first exemplary embodiment of the present invention.

FIG. 1 is a block diagram illustrating a configuration of an image processing system according to a first exemplary embodiment of the present invention.

Referring to FIG. 1, an MFP 100 having a plurality of functions (copy function, print function, transmitting function, etc.) and a client PC 101 are connected with a local area network (LAN) 102 built in an office. Further, a proxy server 103, a document management server 106, and a database 105 for the document management server 106, and a PDA (portable information terminal) 107 are wiredly or wirelessly connected to the LAN 102. The LAN 102 is connected to a network 104 via the proxy server 103. When the client PC 101 transmits print data to the MFP 100, for example, a print product based on the print data can be printed on the MFP 100. The configuration illustrated in FIG. 1 is to be considered as an example. A plurality of offices having a similar configuration may be connected to the network 104.

Each of terminals such as the client PC 101 and the proxy server 103 is provided with standard components (a central processing unit (CPU), a random access memory (RAM), a read-only memory (ROM), a hard disk, a network interface (I/F), a display, a keyboard, a mouse, etc.) provided on a general-purpose computer. The network 104 is typically implemented by any of the Internet, a LAN, a wide area network (WAN), a telephone line, a leased digital network, an asynchronous transfer mode (ATM)-frame relay network, a communication satellite network, a cable television (TV) network, and a wireless network for data broadcasting. Of course, the network 104 may be a communication network implemented with a combination of these networks as long as data transmission and reception are possible.

Figure 2:
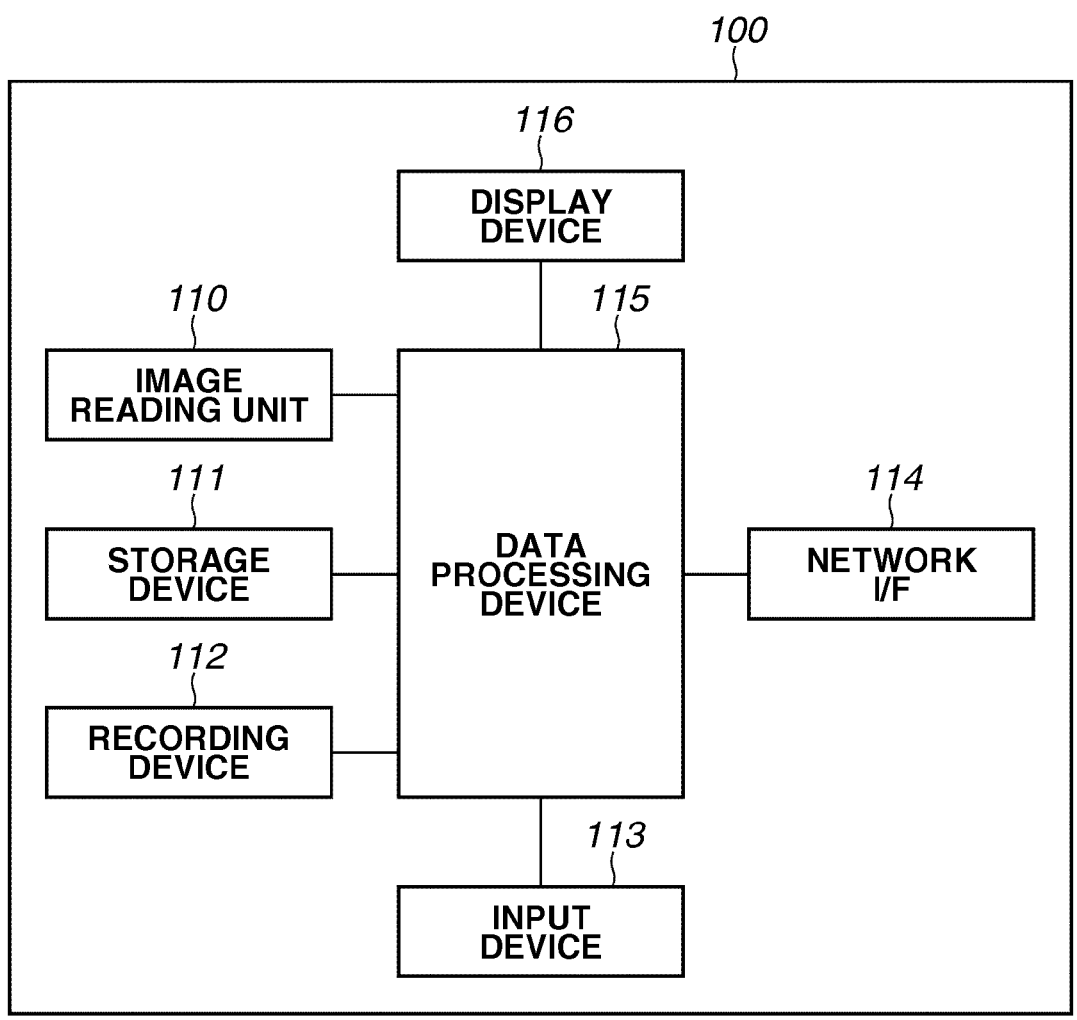
FIG. 2 is a block diagram illustrating a multifunction peripheral (MFP) illustrated in FIG. 1.

FIG. 2 is a block diagram illustrating a functional configuration of the MFP 100 illustrated in FIG. 1. Referring to FIG. 2, the MFP 100 includes an image reading unit 110, a storage device (hereinafter referred to as BOX) 111, a recording device 112, a data processing device 115, an input device 113, a display device 116, and a network I/F 114. The image reading unit 110 is provided with an auto document feeder (hereinafter referred to as an ADF). Images of a bundle of sheets or one sheet are irradiated with light from a light source, and then a reflected image is formed on a solid-state image sensor through a lens. The solid-state image sensor generates an image reading signal having a predetermined resolution (for example, 600 dots per inch (dpi)) and a predetermined luminance level (for example, 8 bits). Based on the image reading signal, image data including raster data is configured. When performing a regular copy function, the image reading unit 110 acquires bitmap image data, the data processing device 115 applies scan image processing (described below) to the bitmap image data to convert it into a recording signal, and the recording device 112 forms an image (outputs a print product). When copying a plurality of sheets, the data processing device 115 once stores in the BOX 111 recording signals for one page and then sequentially outputs the recording signals to the recording device 112 to form a recording image on recording paper. The MFP 100 receives via the LAN 102 and network I/F 114 page description language (PDL) data output from a client PC 101 (or other general-purpose PC (not illustrated)) via a driver, and records in the recording device 112 an image based on the received PDL data. Specifically, the PDL data output from the client PC 101 via the driver is input from the LAN 102 to the data processing device 115 via the network I/F 114. Then, the MFP 100 interprets and processes the language to convert the image data into a recordable recording signal and then records the recording signal as a recording image on recording paper.

The BOX 111 is provided with a function of storing data generated by rendering the data from the image reading unit 110 and the PDL data output from the client PC 101 via the driver. The MFP 100 is operated via a key operation unit (input device 113) provided on the MFP 100. Operation and input statuses are displayed on the display device 116.

Processing for generating application image data according to the present exemplary embodiment will be described below with reference to FIG. 3.

Figure 3:
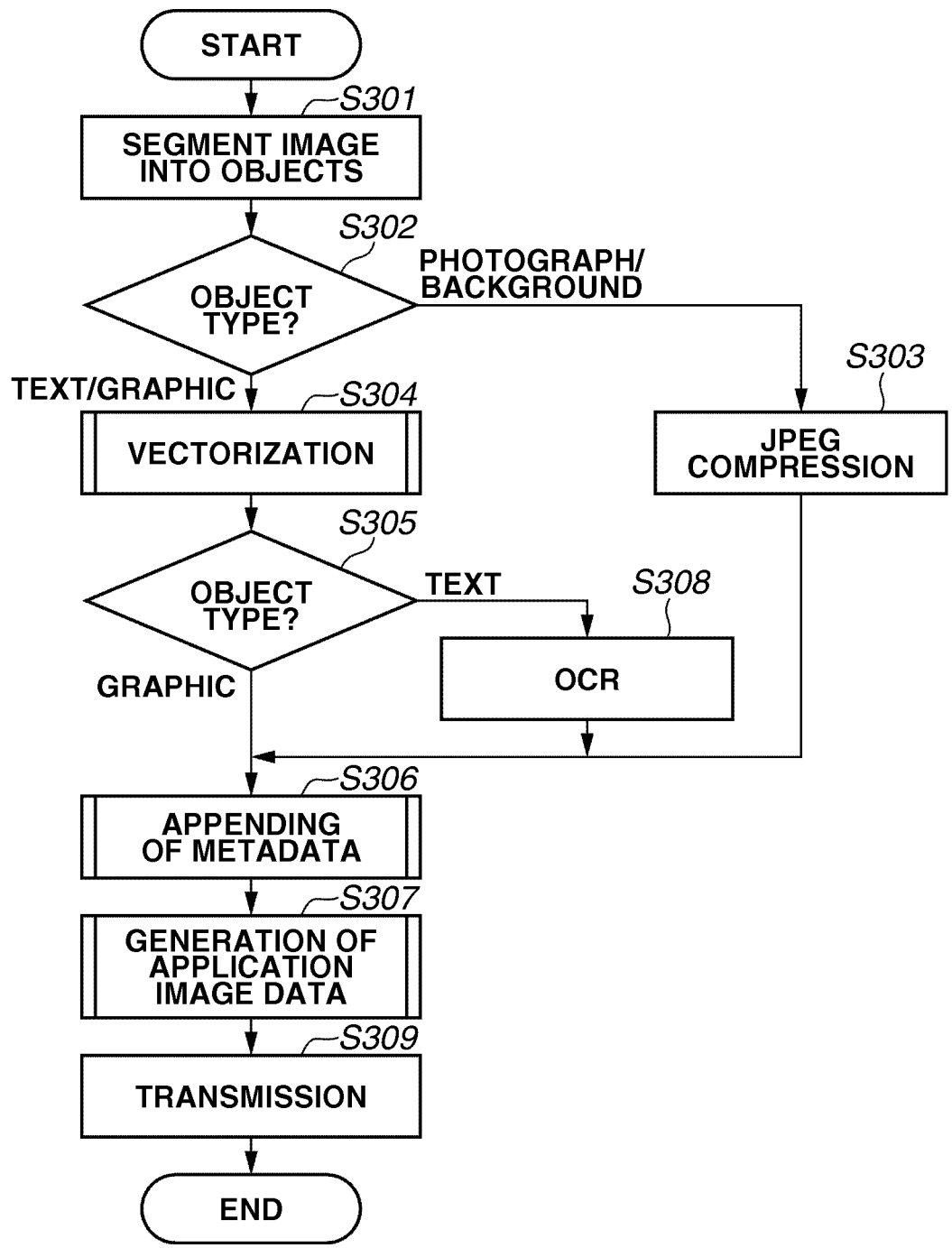
FIG. 3 is a flowchart illustrating first data processing according to the first exemplary embodiment.

FIG. 3 is a flowchart illustrating processing for generating data having a predetermined format (hereinafter referred to as application image data) to be displayed on the PDA 107 based on the bitmap image data acquired by the image reading unit 110 of the MFP 100 and the bitmap image data generated by rendering in the MFP 100 a document generated by application software on the client PC 101.

In step S301, the data processing device 115 applies object segmentation processing to the bitmap image data to segment it into a plurality of objects having respective attributes. Object attribute types after object segmentation include text, photograph, graphics (drawing, line drawing, table, and line), and background. In step S302, the data processing device 115 determines the object type (text, photograph, graphics, or background) for each segmentation object. When an object is determined to be a photograph or background (PHOTOGRAPH/BACKGROUND in step S302), then in step S303, the data processing device 115 applies JPEG compression to a bitmap image of the relevant object. When the relevant object is determined to be a text or graphic (TEXT/GRAPHIC in step S302), then in step S304, the data processing device 115 applies vectorization processing to the relevant object to convert it into path data (vector data). In step S305, the data processing device 115 determines whether the relevant object is a text. When the relevant object is determined to be a text (TEXT in step S305), then in step S308, the data processing device 115 applies optical character recognition (OCR) processing to the relevant object to acquire character-coded data (character code data resulting from the OCR processing). The data processing device 115 groups into one file the data of each object (JPEG data and vector data) obtained in steps S303 and S304 and the character-coded data obtained in step S308. In step S306, the data processing device 115 appends optimum metadata to each object. In step S307, based on each object having appended metadata, the data processing device 115 generates application image data displayable on the PDA 107. In step S309, the data processing device 115 transmits the generated application image data to the PDA 107.

Figure 4:
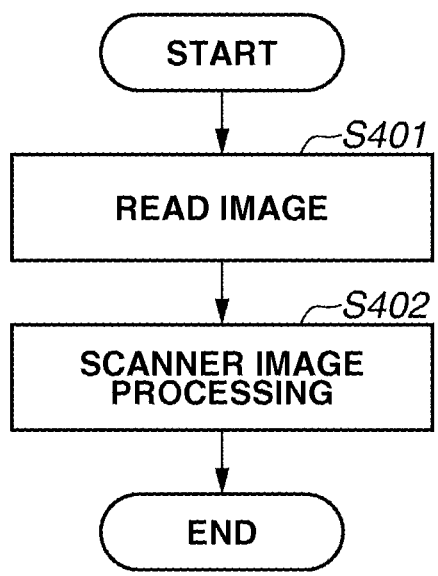
FIG. 4 is a flowchart illustrating processing for reading an image from a scanner according to the first exemplary embodiment.
Figure 5:
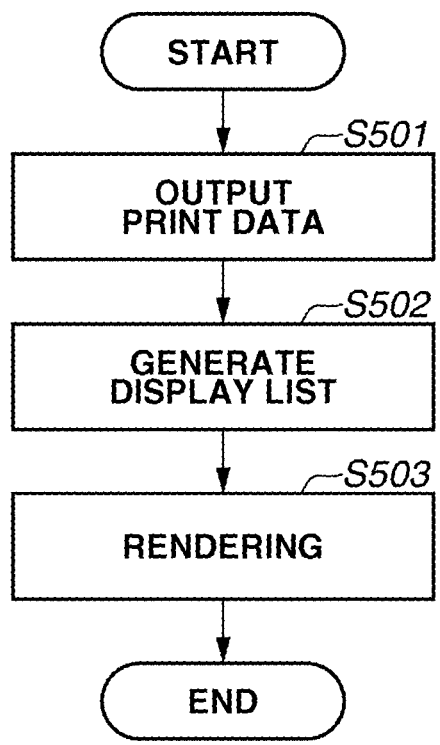
FIG. 5 is a flowchart illustrating processing for converting data from a personal computer (PC) into bitmap data according to the first exemplary embodiment.

Processing for generating bitmap image data (document image data) according to the present exemplary embodiment will be described below with reference to FIGS. 4 and 5. FIG. 4 is a flowchart illustrating bitmap image data generation processing using the image reading unit 110 of the MFP 100. FIG. 5 is a flowchart illustrating the bitmap image data generation processing using an application on the client PC 101. The data processing device 115 applies the above-described processing illustrated in FIG. 3 to the bitmap image data generated by the processing of the flowcharts illustrated in FIGS. 4 and 5.

Processing when the image reading unit 110 of the MFP 100 is used will be described below with reference to FIG. 4. In step S401, the image reading unit 110 reads an image as bitmap image data. In step S402, the data processing device 115 applies scanner image processing, depending on the image reading unit 110, to the bitmap image data. The scanner image processing refers to, for example, color processing and filtering process.

Processing when the application on the client PC 101 is used will be described below with reference to FIG. 5. In step S501, data generated by using an application on the client PC 101 is converted into print data via a print driver on the client PC 101, and then transmitted to the MFP 100. The print data refers to PDL data, such as LBP Image Processing System (LIPS) (trademark) and Postscript (trademark). In step S502, the data processing device 115 generates a display list via an interpreter existing in the MFP 100. In step S503, the data processing device 115 renders the display list to generate bitmap image data.

Figure 6:
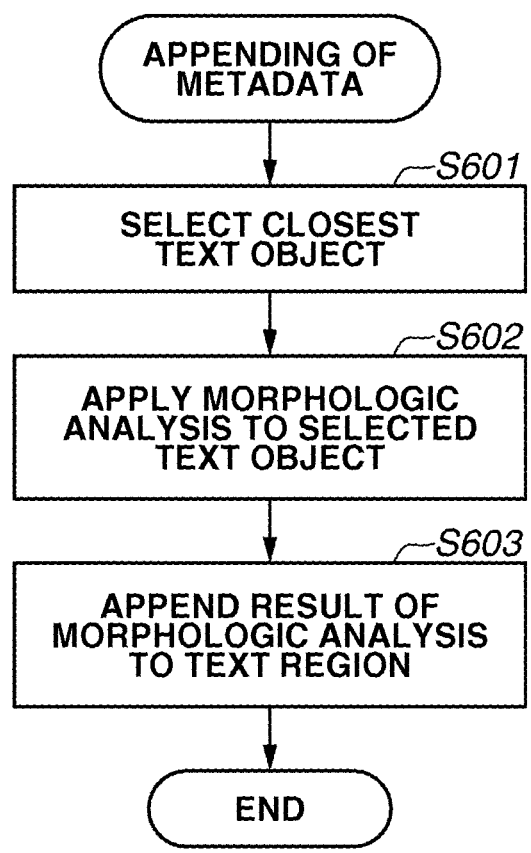
FIG. 6 is a flowchart illustrating metadata appending processing according to the first exemplary embodiment.

Processing for appending metadata in step S306 illustrated in FIG. 3 will be described in detail below with reference to the flowchart illustrated in FIG. 6.

In step S601, the data processing device 115 selects a closest text object existing around each of segmented objects formed in step S301. In step S602, the data processing device 115 applies morphologic analysis to the selected text object. In step S603, the data processing device 115 appends to each object as metadata a word extracted as a result of the morphologic analysis in step S602.

Metadata can be generated not only through the morphologic analysis but also through image feature quantity extraction and syntax analysis. The data processing device 115 may perform similar image search in documents stored in the BOX 111 in the MFP 100 and the database 105 and objects contained in these documents, and then perform correlation with objects of similar images having high similarity.

Figure 7:
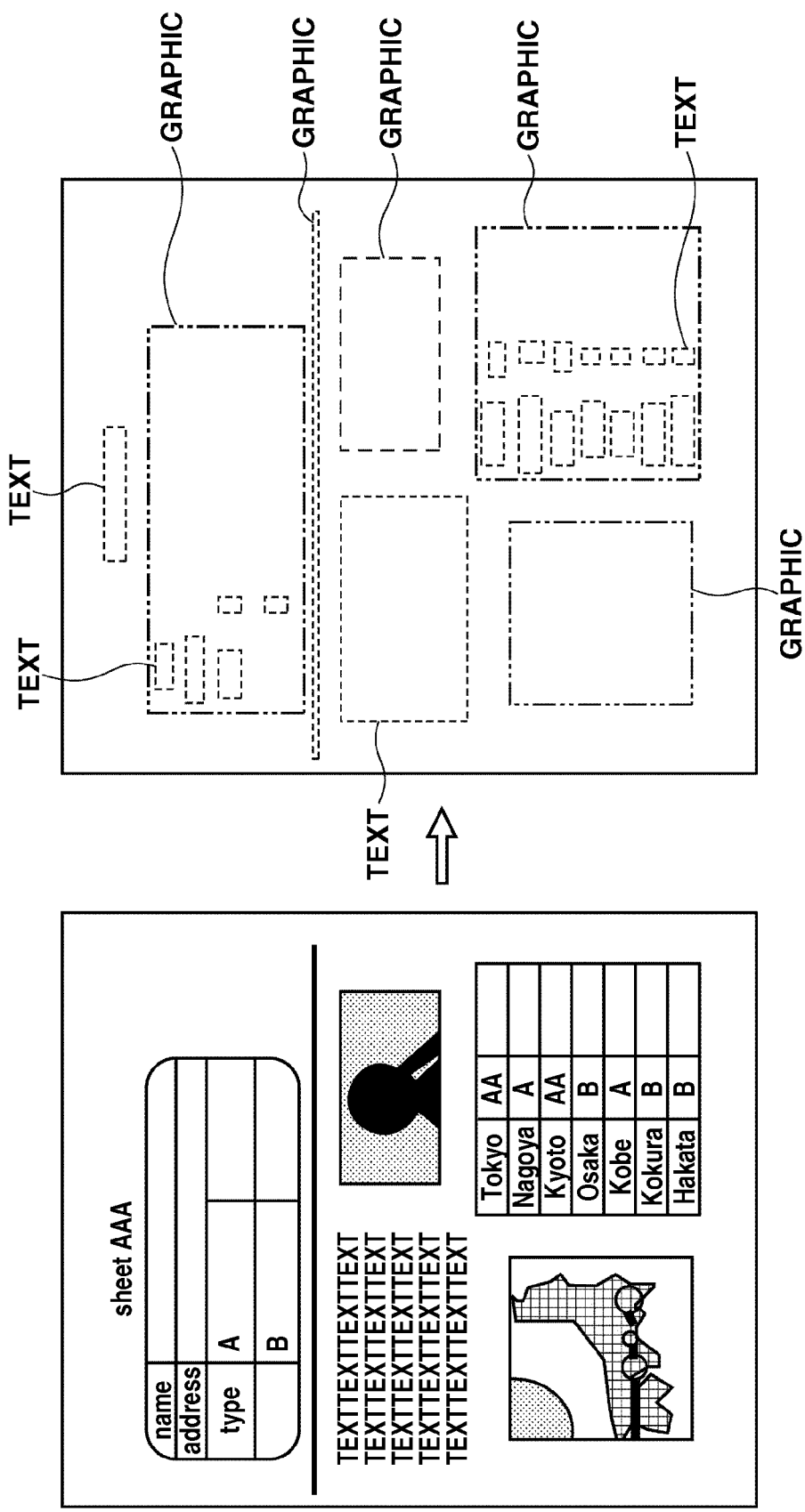
FIG. 7 illustrates a result of example object segmentation.

The object segmentation performed in step S301 will be described in detail below with reference to FIGS. 7 and 8. FIG. 7 illustrates an example result of object segmentation processing for segmenting the bitmap image data into a plurality of objects. FIG. 8 illustrates block information and input file information for each object when the object segmentation is performed.

In step S301, the data processing device 115 applies object segmentation processing to an input image (illustrated on the left in FIG. 7) to segment it into rectangular blocks having respective attributes (illustrated on the right in FIG. 7). As described above, rectangular block attributes include text, photograph, and graphic (drawing, line drawing, table, and line). With an example method of object segmentation processing, processing is performed in the following way. Firstly, the data processing device 115 applies monochrome binarization to the image data stored in the RAM (not illustrated) in the MFP 100 to extract a black pixel cluster (i.e. a black pixel connected component) surrounded by black pixel contours. Then, the data processing device 115 evaluates the size of the black pixel cluster extracted in this way and applies contour tracking to a white pixel cluster (i.e. a white pixel connected component) in the black pixel cluster having a size of a predetermined value or larger. Then, the data processing device 115 evaluates the size of the white pixel cluster and applies contour tracking to a black pixel cluster in the white pixel cluster. In this way, as long as an inner pixel cluster has a size of the predetermined value or larger, the data processing device 115 recursively performs inner pixel cluster extraction and contour tracking. The size of a pixel cluster is evaluated, for example, in terms of the area of the pixel cluster. The data processing device 115 generates a rectangular block which circumscribes the pixel cluster acquired in this way and determines the attribute based on the size and shape of the generated rectangular block. For example, a rectangular block having an aspect ratio close to 1 and a fixed size is considered as a text-equivalent block which may possibly be a text region rectangular block. When text-equivalent blocks in close vicinity regularly align, the data processing device 115 generates a new rectangular block by grouping these text-equivalent blocks, and recognizes the new rectangular block as a text region rectangular block. A black pixel block containing flat pixel blocks or regularly aligning rectangular white pixel blocks having a size of a predetermined value or larger is considered as a graphic region rectangular block. A pixel block having an irregular shape is considered as a photograph region rectangular block.

In step S301, for each of rectangular blocks generated in this way, the data processing device 115 generates block information (including attribute, etc.) and input file information illustrated in FIG. 8. Referring to FIG. 8, the block information includes attribute, X- and Y-coordinates of position, width W, height H, and OCR information for each block. The attribute is represented by a numerical value 1, 2, and 3, respectively indicating a text region rectangular block, a photographic region rectangular block, and a graphic region rectangular block. The X- and Y-coordinates are the X- and Y-coordinates of the starting point (coordinate values of the top left corner) of each rectangular block in the input image. The width W is the width in the X-coordinate direction of the rectangular block, and the height H is the height in the Y-coordinate direction thereof. The OCR information indicates the presence or absence of pointer information to character-coded data generated by the OCR processing in the step S308. The input file information includes the total number of blocks (N) which indicates the number of rectangular blocks.

The block information for each rectangular block will be utilized for vectorization in a specific region. When combining a specific region and other regions, the block information enables identifying a relative positional relation and combining a vectorized region and a bitmap region while maintaining the layout of the input image.

Figure 9:
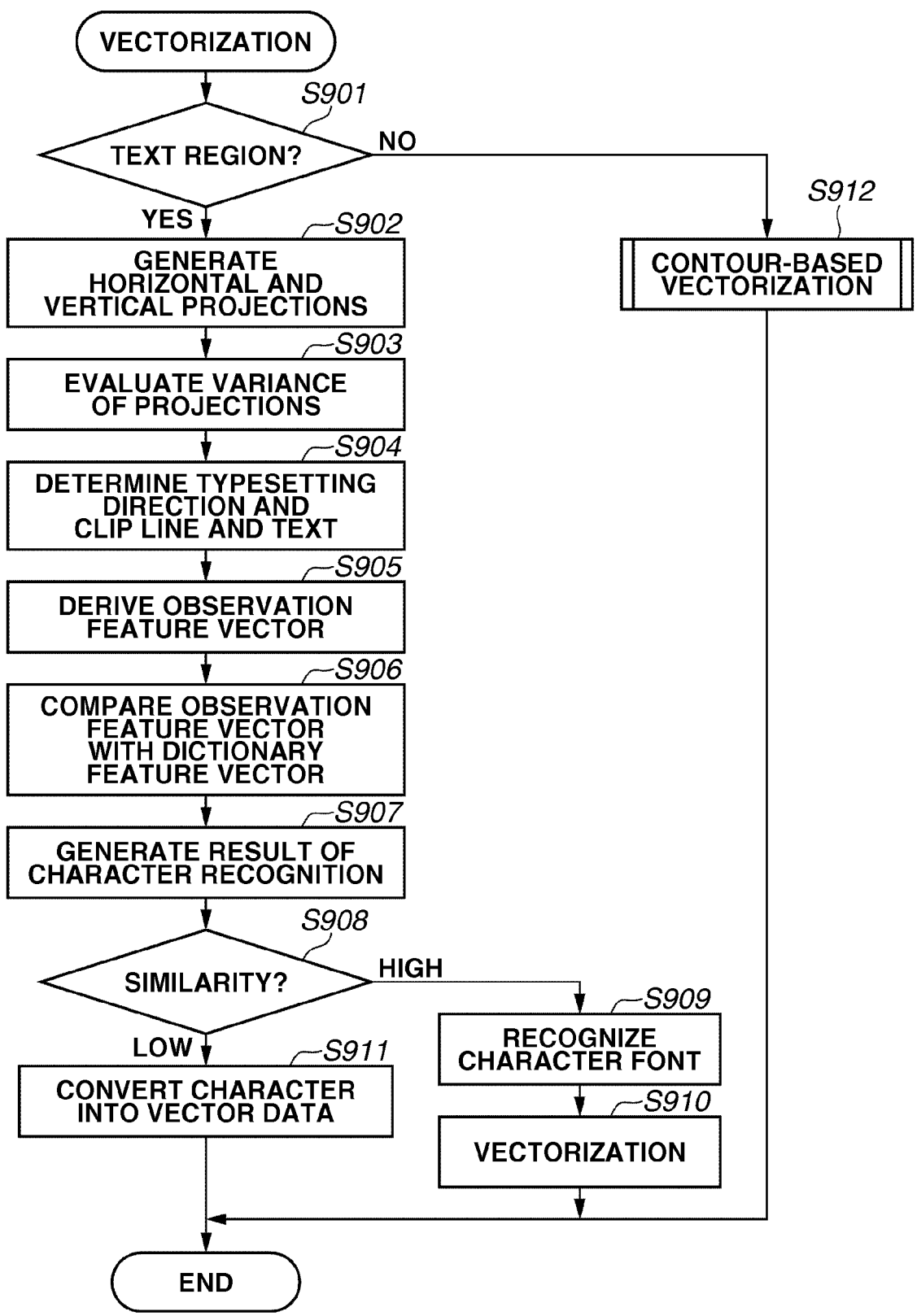
FIG. 9 is a flowchart illustrating vectorization processing according to the first exemplary embodiment.

The vectorization processing in step S304 illustrated in FIG. 3 will be described in detail below with reference to the flowchart illustrated in FIG. 9.

In step S901, the data processing device 115 determines whether the specific region is a text region rectangular block. When the specific region is determined to be a text region rectangular block (YES in step S901), the processing proceeds to step S902 and subsequent steps. Otherwise, when the specific region is determined not to be a text region rectangular block (NO in step S901), the processing proceeds to step S912.

In steps S902 to S907, the data processing device 115 performs character recognition processing by using a pattern matching method, etc., to obtain corresponding a character code. In step S902, for example, the data processing device 115 acquires horizontal and vertical projections with respect to pixel values in the specific region to determine horizontal or vertical writing for the specific region (determination of typesetting direction). In step S903, the data processing device 115 evaluates variance of the projections acquired in step S902. When variance of the horizontal projection is large, the data processing device 115 determines horizontal writing. When variance of the vertical projection is large, the data processing device 115 determines vertical writing. In step S904, based on the result of the evaluation in step S903, the data processing device 115 determines the typesetting direction, clips a row, and then clips characters to acquire a text image. Specifically, the data processing device 115 decomposes the text image into character strings and characters. In the case of a horizontal writing text region, the data processing device 115 clips a row based on the horizontal projection and clips characters based on the vertical projection for the clipped row. In the case of a vertical writing text region, the data processing device 115 performs processing in reverse way. (Specifically, the data processing device 115 clips a column based on the vertical projection and clips characters based on the horizontal projection for the clipped column.) When clipping a row and characters, the character size can also be detected. In step S905, for each character clipped in step S904, the data processing device 115 derives an observation feature vector by converting the feature (obtained from the text image) into a numerical sequence having several tens dimensions. There are various known techniques for extracting a feature vector. For example, a certain technique segments a character in a mesh pattern, counts the number of character lines in each mesh as a line element in each direction, and derives a feature vector having a dimension equal to the count value. In step S906, the data processing device 115 compares the observation feature vector acquired in step S905 with a dictionary feature vector preacquired for each font type to calculate the distance between the observation feature vector and the dictionary feature vector. In step S907, the data processing device 115 evaluates the distance calculated in step S906, and considers the font type having the shortest distance as a result of the character recognition.

In step S908, the data processing device 115 determines whether the shortest distance acquired in the distance evaluation in step S907 is larger than a predetermined value, i.e., determines the similarity. When the shortest distance is determined to be equal to or larger than the predetermined value (similarity is low), the character may possibly be erroneously recognized as others having a similar shape in the dictionary feature vector. Accordingly, when the shortest distance is determined to be equal to or larger than the predetermined value (similarity is low, i.e., LOW in step S908), the data processing device 115 does not adopt the result of the character recognition in step S907, and the processing proceeds to step S911. Otherwise, when the shortest distance is determined to be smaller than the predetermined value (similarity is high, i.e., HIGH in step S908), the data processing device 115 adopts the result of the character recognition in step S907, and the processing proceeds to step 909.

In step S909, the data processing device 115 recognizes the font type. For use during the character recognition, a plurality of dictionary feature vectors is prepared for the number of font types, i.e., character shapes. At the time of pattern matching, the font type is output together with the character code to enable font recognition. In step S910, based on the character code and font information acquired in the character recognition and font recognition, the data processing device 115 converts each character into vector data by using outline data prepared for each character. When the input image is a color image, the data processing device 115 extracts the color of each character from the color image and then records the color together with the vector data.

In step S911, the data processing device 115 outlines the character by handling it in a similar way to graphics. Specifically, for characters which are highly likely to be erroneously recognized, the data processing device 115 generates outline vector data apparently conforming to the bitmap data.

In step S912 (when the specific region is not a text region rectangular block, i.e., it is a graphic region rectangular block), the data processing device 115 applies the vectorization processing based on the contour of the image.

The above-described processing enables converting image information belonging to the text and graphic region rectangular blocks into vector data.

Figure 10:
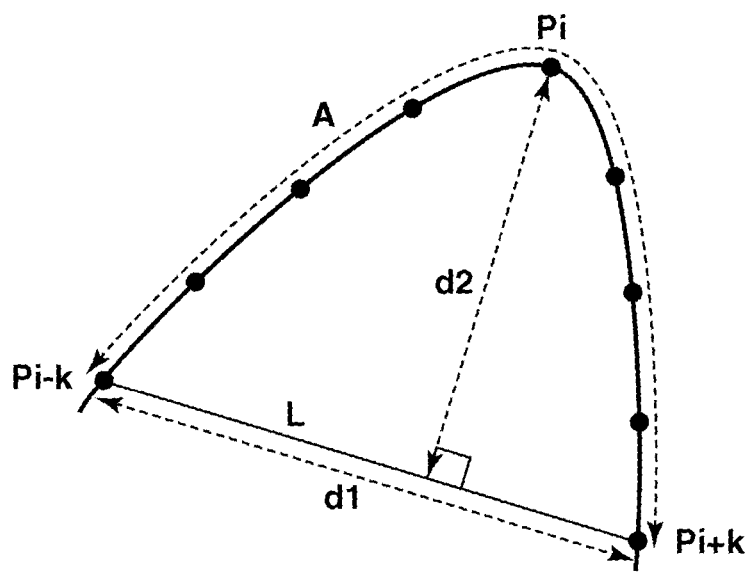
FIG. 10 illustrates angle extraction processing in the vectorization processing.
Figure 11:
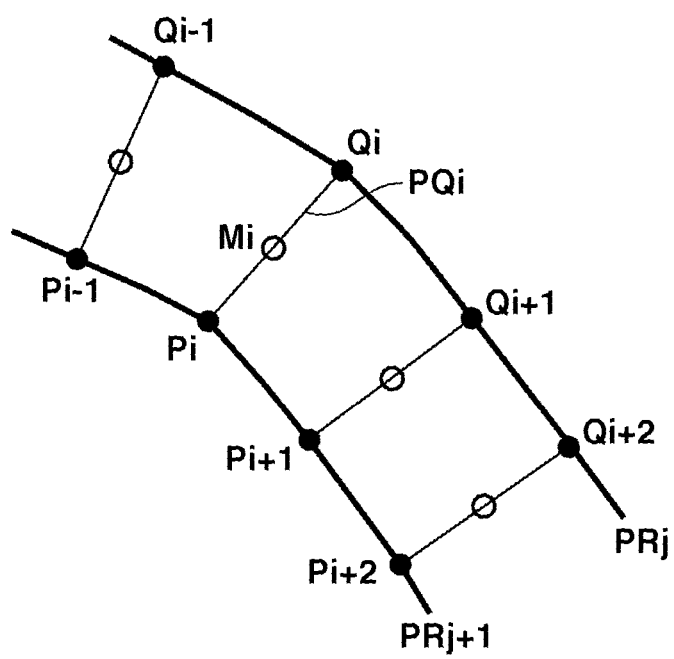
FIG. 11 illustrates contour lines grouping processing in the vectorization processing.
Figure 12:
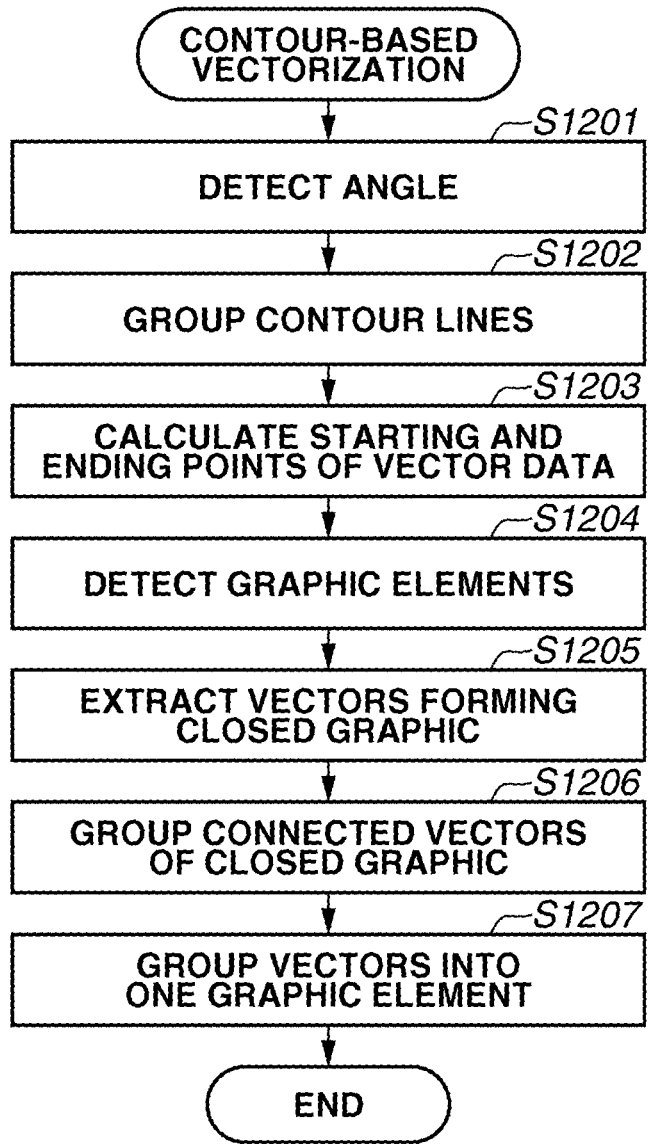
FIG. 12 is a flowchart illustrating contour-based vectorization processing.

The vectorization processing applied to the graphic region rectangular block in step S912 will be described in detail below with reference to FIGS. 10, 11, and 12. The data processing device 115 applies the vectorization processing to the graphic region rectangular block based on contours of black pixel clusters extracted in the relevant region. FIG. 10 illustrates angle extraction processing in the vectorization processing. FIG. 11 illustrates contour lines grouping processing in the vectorization processing. FIG. 12 is a flowchart illustrating in detail the vectorization processing in the graphic region. In step S1201 illustrated in FIG. 12, the data processing device 115 detects an "angle" which segments a curve into a plurality of sections (pixel rows) to represent a line drawing as a combination of straight lines and/or curves. An angle refers to a point at which the curvature is maximized. As illustrated in FIG. 10, the data processing device 115 determines whether a pixel Pi on a curve is an angle in the following way. Specifically, pixels Pi−k and Pi+k are respectively separated from the pixel Pi by a predetermined distance, represented by the number of pixels (k), in both directions along the curve. The pixels Pi−k and Pi+k are connected by a line segment L. The pixels Pi−k and Pi+k have a distance d1. The line segment L and the pixel Pi have a distance d2. An arc along the curve between the pixels Pi−k and Pi+k has a length A. When the distance d2 is maximized or when a ratio d1/A is equal to or smaller than a threshold value, the data processing device 115 determines the pixel Pi as an angle. Then, the data processing device 115 approximates the pixel row segmented by the angle to a straight line or a curve. The approximation to a straight line is made by using the least squares method, and the approximation to a curve is made by using the cubic spline function. The pixel of the angle segmenting the pixel rows serves as a starting or ending point of the approximation straight line or curve. The data processing device 115 further determines whether an inner contour of a white pixel cluster exists in the vectorized contour. When an inner contour is determined to exist, the data processing device 115 vectorizes the inner contour. Similarly, as long as an inner contour exists, the data processing device 115 recursively vectorizes an inner contour of an inverted pixel. As described above, the use of the contour segmentation line approximation enables vectorizing the outline of a graphic having any shape. When the original document is colored, the data processing device 115 extracts colors of graphics from the color image and record the colors together with the vector data.

In step S1202, when the contour lines acquired in step S1201 are in close vicinity, the data processing device 115 groups these contour lines to form a line having a thickness. As illustrated in FIG. 11, when an outer contour PRj is in close vicinity of an inner contour PRj+1 or another outer contour in a certain target section, the data processing device 115 can group two or more contour lines and represent them as a line having a thickness. For example, the data processing device 115 calculates a shortest distance PQi between a pixel Pi on the contour PRj+1 and a pixel Qi on the contour PRj. With a small variance in the distance PQi, the data processing device 115 may approximate the target section by using a straight line or curve along a point sequence of a midpoint Mi between pixels Pi and Qi. The thickness of the approximation straight line and approximation curve is considered to be, for example, the average of the distance PQi. Considering tabular ruled lines (lines and a set of lines) as a set of lines having a thickness enables efficient vector expression.

In step S1203, the data processing device 115 calculates starting and ending points of each piece of vector data.

In step S1204, the data processing device 115 detects graphic elements based on the starting and ending points acquired in step S1203. A graphic element refers to a closed graphic formed of sectioned lines. To detect a graphic element, the data processing device 115 connects vectors at the pixel of the common angle which serves as starting and ending points. This processing is based on a principle that each of vectors forming a closed shape has connecting vectors at both ends.

In step S1205, based on the vector data, the data processing device 115 removes unnecessary vectors not connecting with both ends to extract only vectors forming the closed graphic.

In step S1206, starting with one edge point (starting or ending point) of any one vector, the data processing device 115 sequentially search for each of the vectors forming the closed graphic vector in a fixed direction, for example, in the clockwise direction. Specifically, at the other edge point of the relevant vector, the data processing device 115 searches for an edge point of other vector, and considers the closest edge point within a predetermined distance as an edge point of a connection vector. When the data processing device 115 completes search for all of the vectors forming the closed graphic (and returns to the starting point), the data processing device 115 groups all of the traced vectors as a closed graphic forming a graphic element. The data processing device 115 also groups all of the vectors forming the closed graphic existing in the closed graphic. The data processing device 115 further repeats similar processing, starting with the starting point of a vector which has not yet been grouped.

In step S1207, out of unnecessary vectors removed in step S1205, the data processing device 115 detects a vector having an edge point close to any vector grouped as a closed graphic in step S1206, and groups the detected vector as a graphic element. This enables grouping other graphic elements exiting in the graphic elements, or sectioned lines to form a graphic object. Further, when other graphic elements or sectioned lines do not exist in the graphic element, the data processing device 115 considers the graphic element as a graphic object.

The above-described processing enables converting the graphic region rectangular block into a vectorized object.

Figure 13:
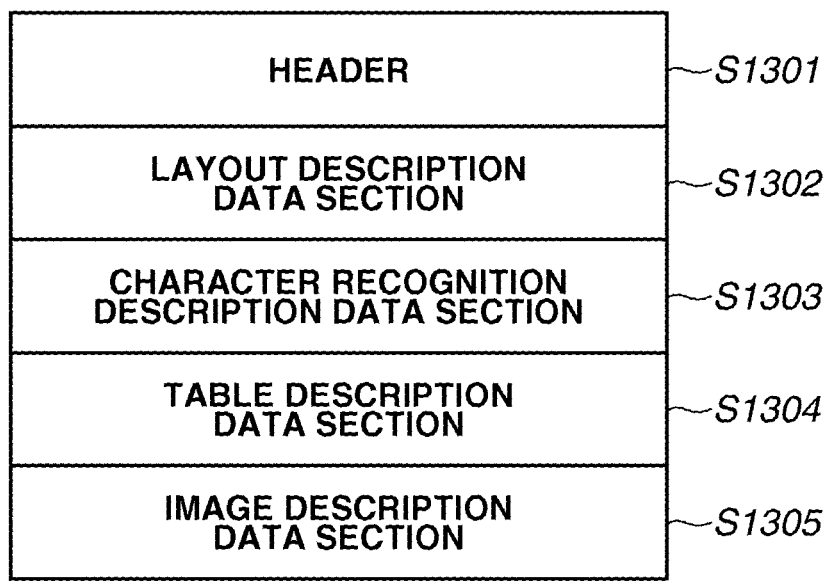
FIG. 13 illustrates data resulting from the vectorization processing according to the first exemplary embodiment.
Figure 14:
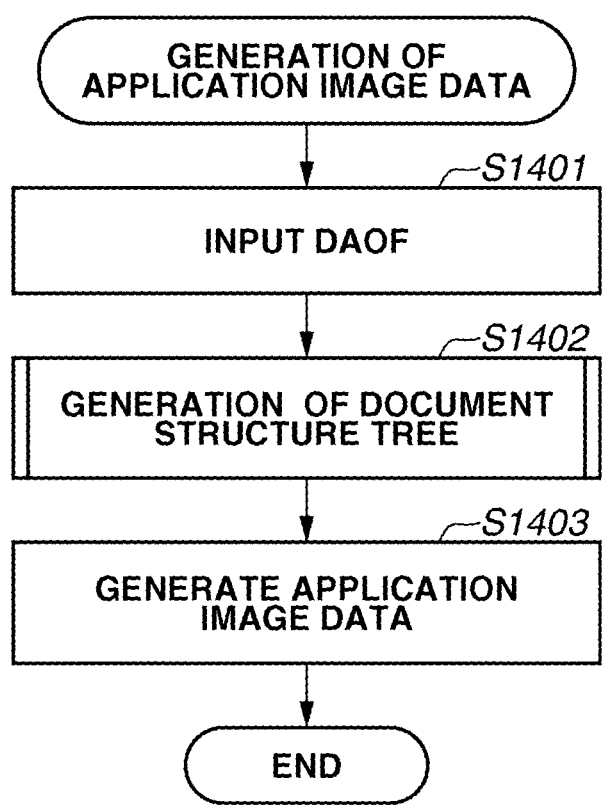
FIG. 14 is a flowchart illustrating application image data generation processing.

Processing for generating application image data in step S307 will be described in detail below with reference to FIGS. 13 and 14. FIG. 13 illustrates a data configuration resulting from the vectorization processing according to the present exemplary embodiment. FIG. 14 is a flowchart illustrating in detail the application image data generation processing.

In step S1401, the data processing device 115 acquires intermediate data generated by the vectorization processing in step S304. In the present exemplary embodiment, the intermediate data is considered to be stored in the document analysis output format (hereinafter referred to as DAOF). As illustrated in FIG. 13, the DAOF includes a header 1301, a layout description data section 1302, a character recognition description data section 1303, a table description data section 1304, and an image description data section 1305. The header 1301 stores information about the target input image. The layout description data section 1302 stores information about the attribute of a rectangular block in the input image, such as text, graphic (line drawing, drawing, table, and line), photograph, etc., and positional information of the rectangular block with recognized attribute. The character recognition description data section 1303 stores a result of character recognition obtained through character recognition, out of text region rectangular blocks. The table description data section 1304 stores a detailed table structure of a graphic region rectangular block having the table attribute. In the specific region where the vectorization processing is instructed, the image description data section 1305 stores the internal structure of a block acquired through the vectorization processing and data set indicating the image shape and character code. In rectangular blocks other than the specific region, not subjected to the vectorization processing, the image description data section 1305 stores bitmap image data itself segmented into objects.

In step S1402, the data processing device 115 generates a document structure tree (described below).

In step S1403, based on the generated document structure tree, the data processing device 115 acquires actual data in the DAOF to generate application image data (described below).

Figure 15:
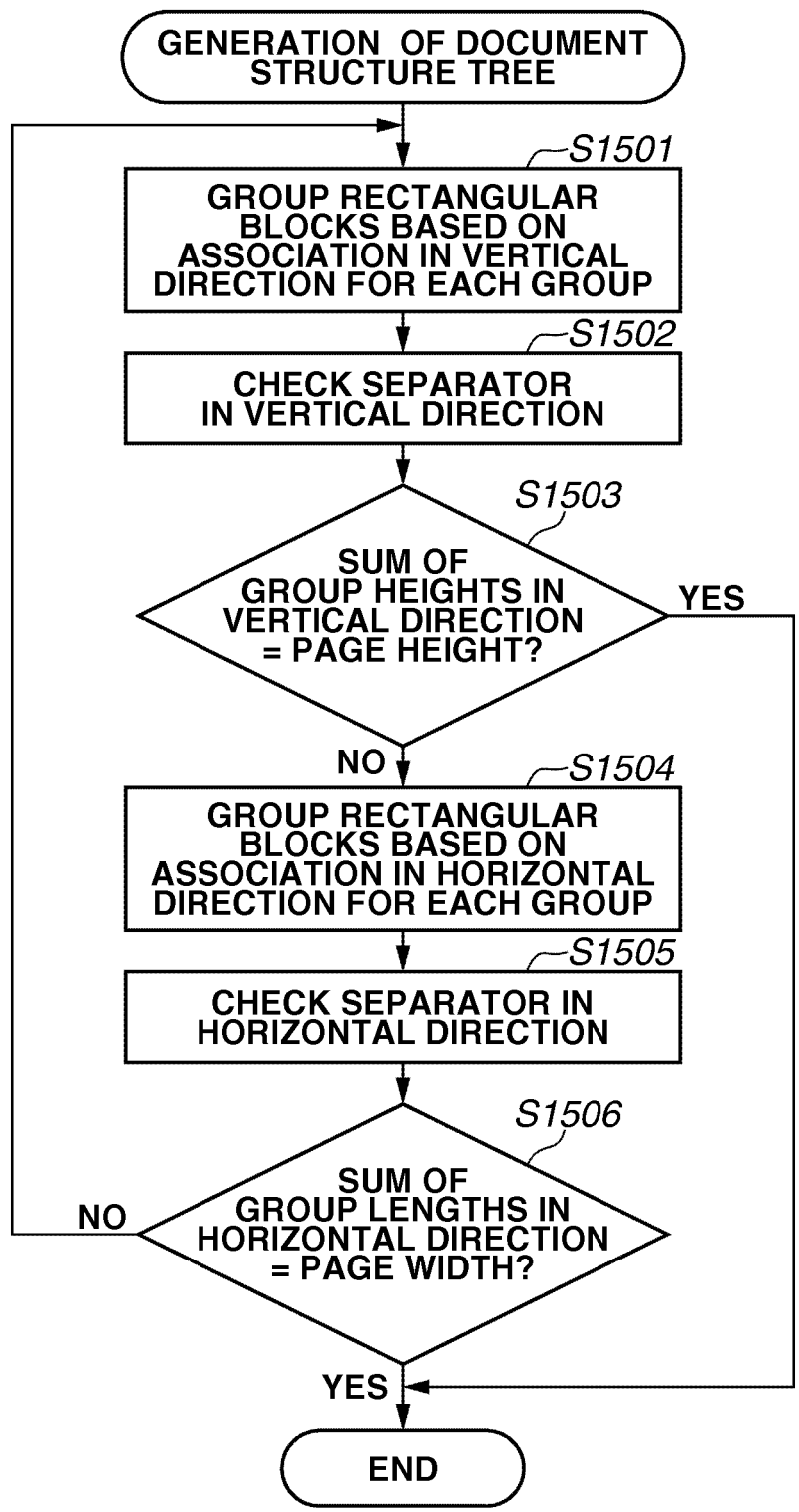
FIG. 15 is a flowchart illustrating document structure tree generation processing.
Figure 16:
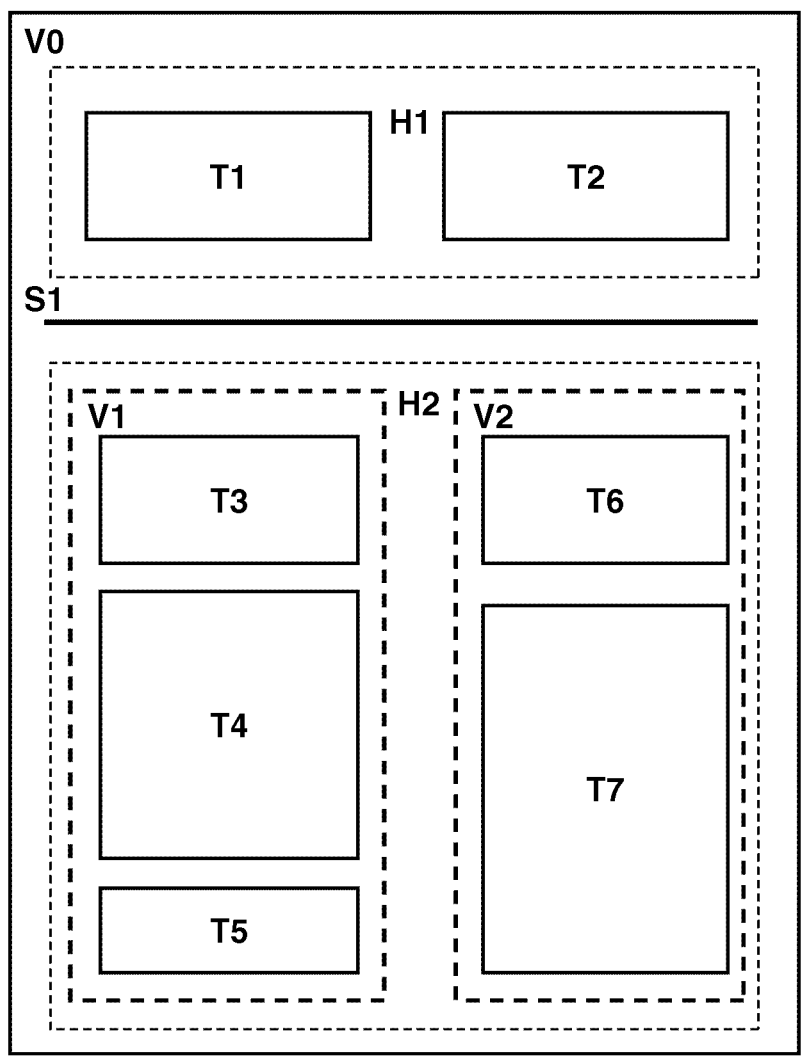
FIG. 16 illustrates a document subjected to the document structure tree generation processing.
Figure 17:
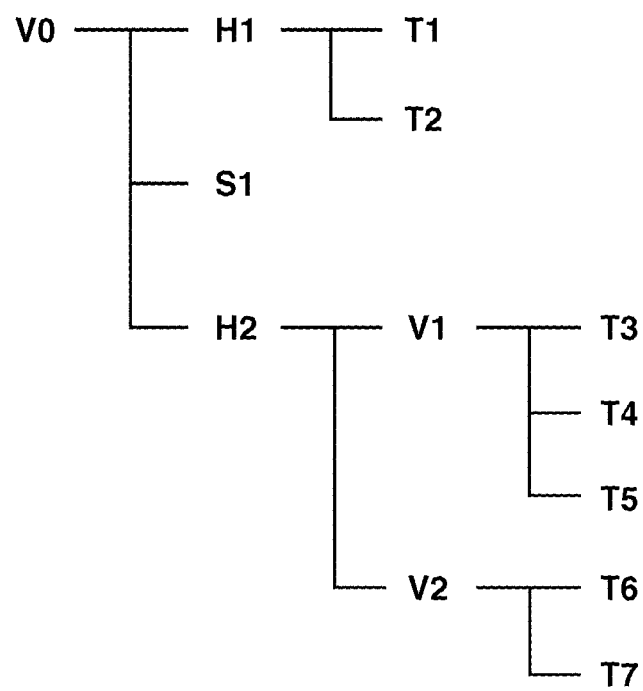
FIG. 17 illustrates a document structure tree generated by the processing illustrated in FIG. 15.

Processing for generating a document structure tree in step S1402 will be described below with reference to FIGS. 15, 16, and 17. FIG. 15 is a flowchart illustrating the document structure tree generation processing. FIG. 16 illustrates an example document subjected to the document structure tree generation processing. FIG. 17 illustrates a document structure tree generated by the document structure tree generation processing.

As a basic rule for overall control in the document structure tree generation processing illustrated in FIG. 15, the flow of processing shifts from a micro block (single rectangular block) to a macro block (set of rectangular blocks). Hereinafter, the term "rectangular block" means both the micro block and the macro block.

In step S1501, the data processing device 115 re-groups rectangular blocks based on the association in the vertical direction, on a rectangular block basis. Although the processing illustrated in FIG. 15 may be repetitively executed, the data processing device 115 makes determination on a micro block basis immediately after the grouping processing is started. The association is defined by such features as a short distance and almost the same block width (block height in the case of horizontal direction). Information such as the distance, width, and height is extracted referring to the DAOF. For example, referring to a document illustrated in FIG. 16, rectangular blocks T1 and T2 are horizontally arranged at the top. A horizontal separator S1 exists under the rectangular blocks T1 and T2. Rectangular blocks T3, T4, T5, T6, and T7 exist under the horizontal separator S1. The rectangular blocks T3, T4, and T5 are vertically arranged on the left half of the region under the horizontal separator S1. The rectangular blocks T6 and T7 are vertically arranged on the right half of the region under the horizontal separator S1. When the data processing device 115 executes the grouping processing based on the association in the vertical direction in step S1501, the rectangular blocks T3, T4, and T5 are grouped into a group (rectangular block) V1, and the rectangular blocks T6 and T7 are grouped into another group (rectangular block) V2. The groups V1 and V2 belong to the same hierarchical level.

In step S1502, the data processing device 115 checks the presence or absence of a vertical separator. A separator is an object having the line attribute in the DAOF, and has a function of explicitly segmenting a block. When a separator is detected, the data processing device 115 segments the region of the input image into right and left parts in the target hierarchical level. No vertical separator exists in the document illustrated in FIG. 16.

In step S1503, the data processing device 115 determines whether the sum of group heights in the vertical direction is equal to the height of the input image. Specifically, when performing horizontal grouping while moving in the vertical direction (for example, from the top downward) in the target region, the data processing device 115 determines whether the sum of group heights is equal to the height of the input image to determine whether the grouping processing is completed for the entire input image. When grouping is determined to be completed (YES in step S1503), the processing exits the flowchart. Otherwise, when grouping is determined not to be completed (NO in step S1503), the processing proceeds to step S1504.

In step S1504, the data processing device 115 performs the grouping processing based on the association in the horizontal direction. Thus, for example, the rectangular blocks T1 and T2 illustrated in FIG. 16 are grouped into a group (rectangular block) H1, and the rectangular blocks V1 and V2 are grouped into a group (rectangular block) H2. The groups H1 and H2 belong to the same hierarchical level. Also in this case, the data processing device 115 makes determination on a micro block basis immediately after the grouping processing is started.

In step S1505, the data processing device 115 checks the presence or absence of a horizontal separator. When a horizontal separator is detected, the data processing device 115 vertically segments the region of the input image by using the separator as a boundary in the target hierarchical level. The horizontal separator S1 exists in FIG. 16. A result of the above-described processing is registered as a tree illustrated in FIG. 17. Referring to FIG. 17, input 1-page bitmap image data V0 has the groups H1 and H2 and the separator S1 in the highest hierarchical level. The rectangular blocks T1 and T2 in the second hierarchical level belong to the group H1. The groups V1 and V2 in the second hierarchical level belong to the group H2. The rectangular blocks T3, T4, and T5 in the third hierarchical level belong to the group V1. The rectangular blocks T6 and T7 in the third hierarchical level belong to the group V2. In the present exemplary embodiment, V0 indicates a page, and other elements in the hierarchies under the page V0 are all objects.

In step S1506, the data processing device 115 determines whether the sum of group lengths in the horizontal direction is equal to the width of the input image to determine whether horizontal grouping is completed for the entire input image. When the sum of group lengths in the horizontal direction is determined to be equal to the width of the input image (YES in step S1506), the processing exits the flowchart (ends the document tree generation processing). When the sum of group lengths in the horizontal direction is determined not to be equal to the width of the input image (NO in step S1506), the processing returns to step S1501 to repeat the above-described processing from association check in the vertical direction in the higher hierarchical level.

An example format of the application image data in the present exemplary embodiment will be described below with reference to FIG. 18. In the present exemplary embodiment, the Scalable Vector Graphics (hereinafter referred to as SVG) format is used as the format of the application image data.

Referring to FIG. 18, notations for objects are enclosed by boxes 1801 to 1804 for description. Each object has region information indicating a region of the object, and a drawing element acquired from actual data in the DAOF. Further, objects having only the region information and no drawing element (for example, H1, H2, V1, and V2 illustrated in FIG. 17) are also possible. The box 1801, having the photograph attribute, indicates region information about a region of a photographic object and bitmap information as a drawing element. The box 1802 indicates information about a text object. The box 1803 represents the contents of the box 1802 as a vectorized object. The box 1804 indicates a graphic object such as a line drawing.

Although, in the present exemplary embodiment, the application image data is described in the SVG format, the format is not limited thereto and may be any image format which enables describing and maintaining the meaning and structure of the document.

Figure 19:
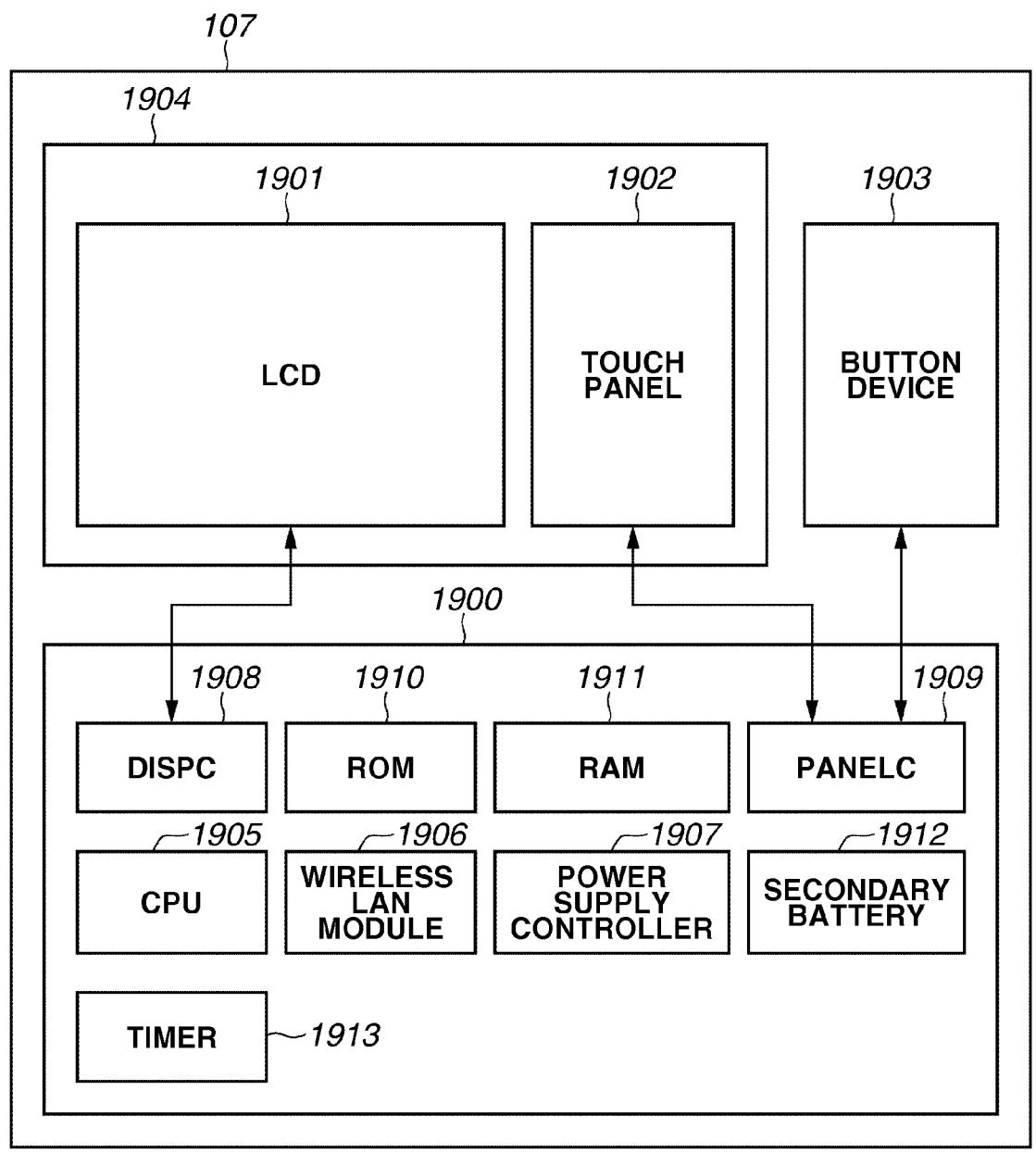
FIG. 19 is a block diagram illustrating a configuration of a PDA.

FIG. 19 is a block diagram illustrating an example configuration of the PDA 107 according to the present exemplary embodiment.

The PDA 107 includes a main board 1900, a liquid crystal display (LCD) 1901, a touch panel 1902, and a button device 1903. The LCD 1901 and the touch panel 1902 are collectively referred to as a touch UI 1904.

The main board 1900 mainly includes a central processing unit (CPU) 1905, a wireless LAN module 1906, a power supply controller 1907, a display controller (DISPC) 1908, a panel controller (PANELC) 1909, a read-only memory (ROM) 1910, a random access memory (RAM) 1911, a secondary battery 1912, and a timer 1913. The modules 1905 to 1913 are connected with each other via a bus (not illustrated).

The CPU 1905 is a processor which controls each module connected to the bus, and loads into the RAM 1911 a software module 2000 (described below) stored in the ROM 1910. The RAM 1911 functions as a main memory and a work area for the CPU 1905, an area for video image to be displayed on the LCD 1901, and a storage area of the above-described application image data transmitted from the MFP 100.

The display controller (DISPC) 1908, in response to a request from the CPU 1905, switches video image output data loaded in the RAM 1911 at high speed and outputs a synchronizing signal to the LCD 1901. As a result, the video image in the RAM 1911 is output to the LCD 1901 in synchronization with the synchronizing signal of the DISPC 1908, and a relevant image is displayed on the LCD 1901.

The panel controller (PANELC) 1909 controls the touch panel 1902 and the button device 1903 in response to a request from the CPU 1905. With this control, a position pressed on the touch panel 1902 by the finger or a pointing device (stylus pen) and the key code of a key pressed on the button device 1903 are notified to the CPU 1905. Information about the pressed position includes a coordinate value (hereinafter referred to as X-coordinate) indicating the absolute position on the touch panel 1902 in the horizontal direction, and a coordinate value (hereinafter referred to as Y-coordinate) indicating the absolute position thereon in the vertical direction. The touch panel 1902 is capable of detecting positions of a plurality of pressed points and notifying information about positions for the number of pressed points to the CPU 1905.

The power supply controller 1907 is connected with an external power supply (not illustrated) to receive the power supplied therefrom. The power supply controller 1907 supplies the power to the entire PDA 107 while charging the secondary battery 1912 connected to the power supply controller 1907. When the power is not supplied from the external power supply, the power supply controller 1907 supplies to the entire PDA 107 the power from the secondary battery 1912.

The wireless LAN module 1906, under the control of the CPU 1905, establishes wireless communication with wireless LAN modules on wireless access points (not illustrated) connected to the above-described LAN 102 to serve as an intermediate for communication with the PDA 107. An example of the wireless LAN module 1906 is IEEE802.11b.

The timer 1913, under the control of the CPU 1905, generates a timer interrupt to a gesture event generation unit 2001, which will be described in detail below.

Figure 20:
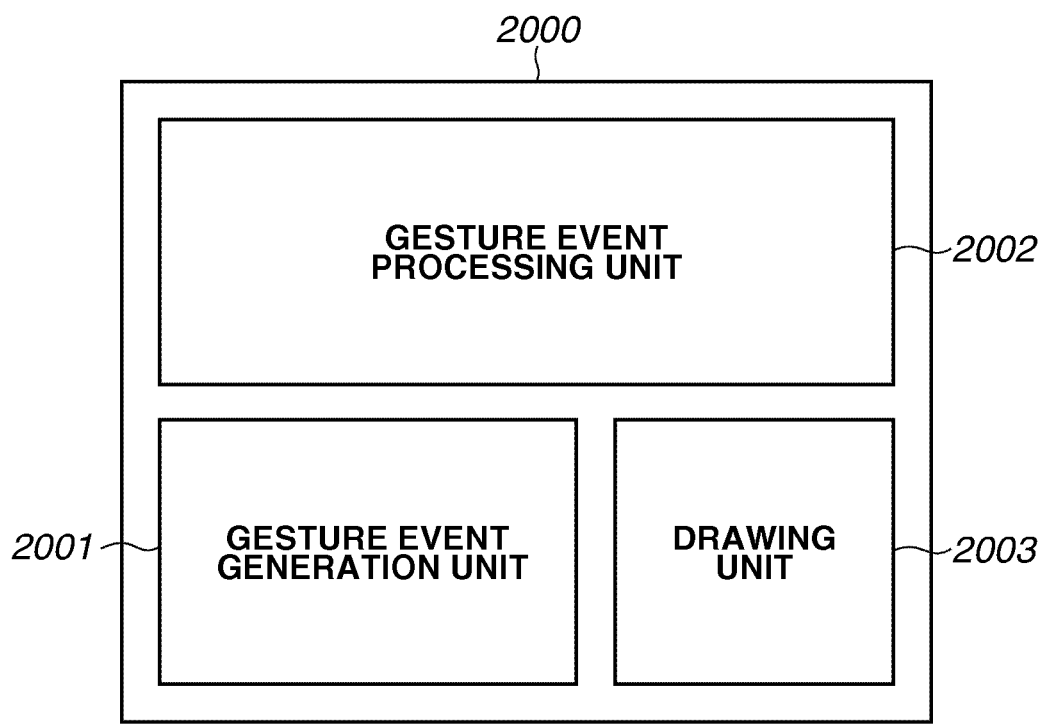
FIG. 20 is a block diagram illustrating a software module configuration of the PDA.

FIG. 20 is a block diagram illustrating a configuration of the software module 2000 executed by the CPU 1905 of the PDA 107. Each unit of the software module 2000 will be described below.

The gesture event generation unit 2001 generates various gesture events (described below) in response to a user's touch input, and transmits a generated gesture event to a gesture event processing unit 2002. Upon reception of the gesture event generated by the gesture event generation unit 2001, the gesture event processing unit 2002 executes processing based on the received gesture event and the document structure described in the application image data. A drawing unit 2003 draws on the LCD 1901 the application image data transmitted from the MFP 100 based on a result of the processing of the gesture event processing unit 2002. A method for displaying the application image data will be described below.

FIGS. 21A, 21B, 21C, 21D, 21E, 21F, 21G, 21H, 21I, 21J, 21K, and 21L illustrate names of gesture events generated by the gesture event generation unit 2001 and information to be transmitted to the gesture event processing unit 2002 when each event occurs.

FIG. 21A illustrates a touch press event. When this even occurs, the latest coordinate values of the touch coordinates and the latest touch coordinate number are transmitted to the gesture event processing unit 2200. The touch coordinates refer to a pair of coordinate values (X- and Y-coordinates) of a point on the touch panel 1902 the user's finger touches. The touch coordinate number indicates the number of touch coordinates on the touch panel 1902 the user's finger touches. The touch coordinates are updated when the user's finger touches the touch panel 1902, when the finger moves thereon, when the finger separates therefrom, and when an interrupt from the timer 1913 occurs.

FIG. 21B illustrates a swipe event. When this event occurs, coordinate values of the latest touch coordinates, and a moving distance calculated based on a difference between the latest and last coordinate values are transmitted to the gesture event processing unit 2200. A swipe refers to a motion of moving the fingertip in any one direction (similar to a sliding motion) while keeping in contact with the touch panel 1902.

FIG. 21C illustrates a pinch-in event. When this event occurs, center coordinate values of the latest touch coordinates of two points, and a pinch-in reduction rate calculated based on a reduced distance of a straight line connecting the touch coordinates of the two points are transmitted to the gesture event processing unit 2200. A pinch-in refers to a motion of bringing the two fingertips mutually close (similar to a nipping motion) while keeping in contacted with the touch panel 1902.

FIG. 21D illustrates a pinch-out event. When this event occurs, center coordinate values of the latest touch coordinates of two points and a pinch-out enlargement rate calculated based on an enlarged distance of a straight line connecting the touch coordinates of the two points are transmitted to the gesture event processing unit 2200. A pinch-out refers to a motion of bringing the two fingertips mutually apart (similar to a widening motion) while keeping in contacted with the touch panel 1902.

FIG. 21E illustrates a two-point swipe event. When this even occurs, coordinate values of the latest touch coordinates of two points, and a moving distance calculated based on a difference between the latest and last coordinate values of the touch coordinates of the two points are transmitted to the gesture event processing unit 2200. The two-point swipe event occurs when touch coordinates of the two points move in the same direction.

FIG. 21F illustrates a rotate event. When this event occurs, rotation center coordinate values calculated based on the latest touch coordinates of two points, and a rotational angle calculated based on the latest and last coordinate values of the touch coordinates of the two points are transmitted to the gesture event processing unit 2200. A rotate refers to a motion of rotating the two fingertips with respect to the touch panel 1902 while keeping in contact therewith.

FIG. 21G illustrates a flick event. When this event occurs, coordinate value of the latest touch coordinate, and a moving speed of the finger calculated based on the latest and last coordinate values are transmitted to the gesture event processing unit 2200. A flick refers to a motion of separating from the touch panel 1902 (similar to a bouncing motion) during the swipe operation.

FIG. 21H illustrates a touch release event. When this event occurs, coordinate values of the latest touch coordinates when the user's finger separates from the touch panel 1902, and the number of coordinates are transmitted to the gesture event processing unit 2002.

FIG. 21I illustrates a double-tap event. When this event occurs, coordinate values of the latest touch coordinates are transmitted to the gesture event processing unit 2002. A double-tap refers to an event in which a single-tap event (described below) occurs within a predetermined time duration.

FIG. 21J illustrates a single-tap event. When this event occurs, coordinate values of the latest touch coordinates are transmitted to the gesture event processing unit 2002. A single-tap refers to an event in which the above-described touch press event occurs and subsequently the touch release event occurs within a predetermined time duration.

FIG. 21K illustrates a long-tap event. When this event occurs, coordinate values of the latest touch coordinates are transmitted to the gesture event processing unit 2002. A long-tap refers to an event in which the above-described touch press event occurs and, after a predetermined time duration has elapsed, the touch release event occurs.

FIG. 21L illustrates a touch-and-hold event. When this event occurs, coordinate values of the latest touch coordinates are transmitted to the gesture event processing unit 2002. A touch-and-hold refers to an event in which, since the user's finger touches the touch panel 1902, a predetermined time duration has elapsed keeping in contact therewith without moving.

Although, in the above-described examples, the user uses the finger for touch input, a stylus pen may be used.

Figure 22:
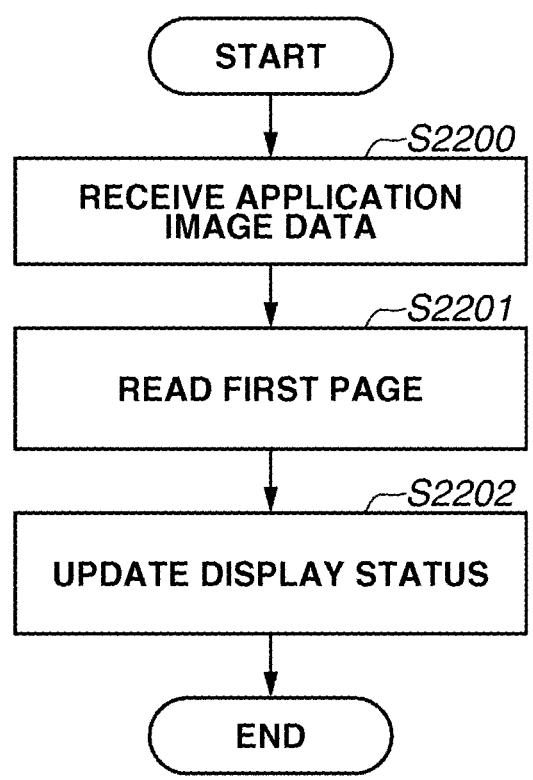
FIG. 22 is a flowchart illustrating processing executed when the PDA receives the application image data.
Figure 23:
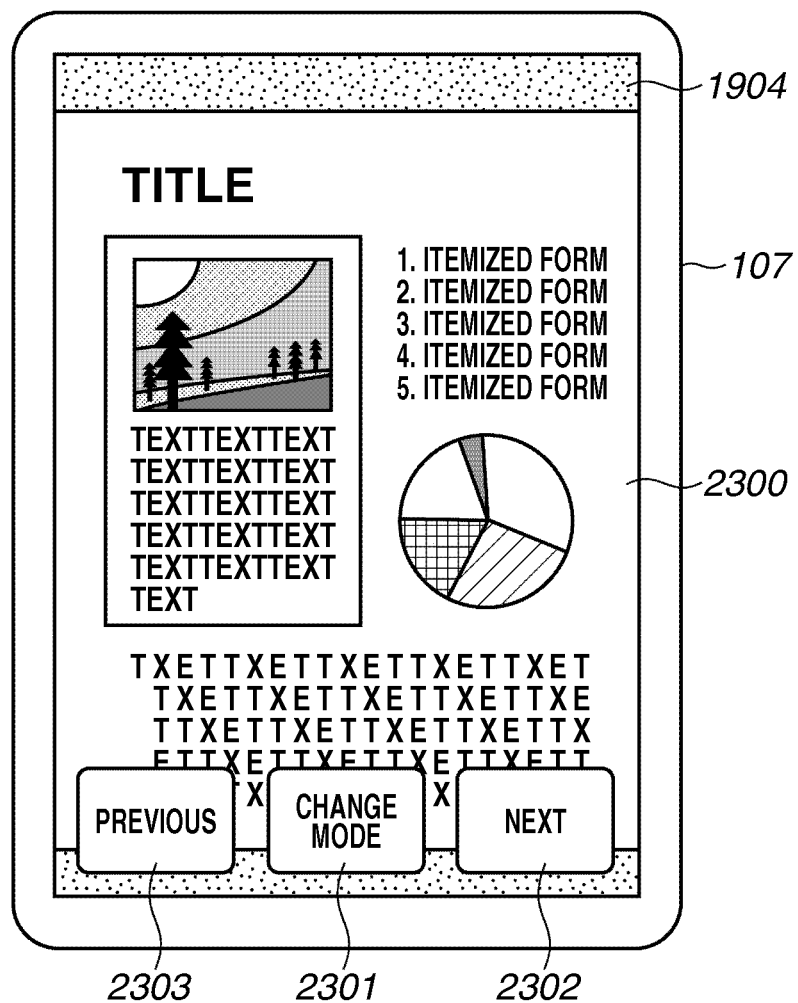
FIG. 23 illustrates example screen display of a touch user interface (UI) of the PDA.

Processing performed by the PDA 107 upon reception of the application image data according to the present exemplary embodiment will be described below with reference to FIGS. 22 and 23. FIG. 22 is a flowchart illustrating processing executed by the PDA 107 upon reception of the application image data. FIG. 23 illustrates example screen display of the touch UI 1904 of the PDA 107 according to the present exemplary embodiment.

In step S2200, the PDA 107 receives the application image data from the MFP 100 via the wireless LAN module 1906, and stores the received application image data in the RAM 1911.

In step S2201, the PDA 107 analyzes the syntax of the application image data stored in the RAM 1911, and reads the first page and objects contained therein.

In step S2202, the drawing unit 2003 renders all of objects (background, text, photograph, and graphic) contained in the read first page according to the starting point coordinates, width, and height of each object to refresh the screen display of the touch UI 1904. In this case, as illustrated in a page 2300 in FIG. 23, the PDA 107 controls the display magnification for the first page according to the width of the touch UI 1904. When the height of the page (when reduced to the display magnification) is smaller than the height of the touch UI 1904, the PDA 107 controls the starting point of the page 2300 in the coordinates on the touch UI 1904 so that the page is displayed at the center of the touch UI 1904. Otherwise, when the height of the page (when reduced to the display magnification) is larger than the height of the touch UI 1904, the PDA 107 controls the starting point of the page 2300 in the coordinates on the touch UI 1904 so that the starting point is aligned with the starting point of the touch UI 1904 (for example, the top left corner of the screen). In the present exemplary embodiment, a display control mode in which the entire page is displayed on the touch UI 1904 in this way is referred to as page display mode.

Software modules related to operation control of the application image data of the PDA 107 according to the present exemplary embodiment will be described below with reference to FIGS. 23 and 24.

Figure 24:
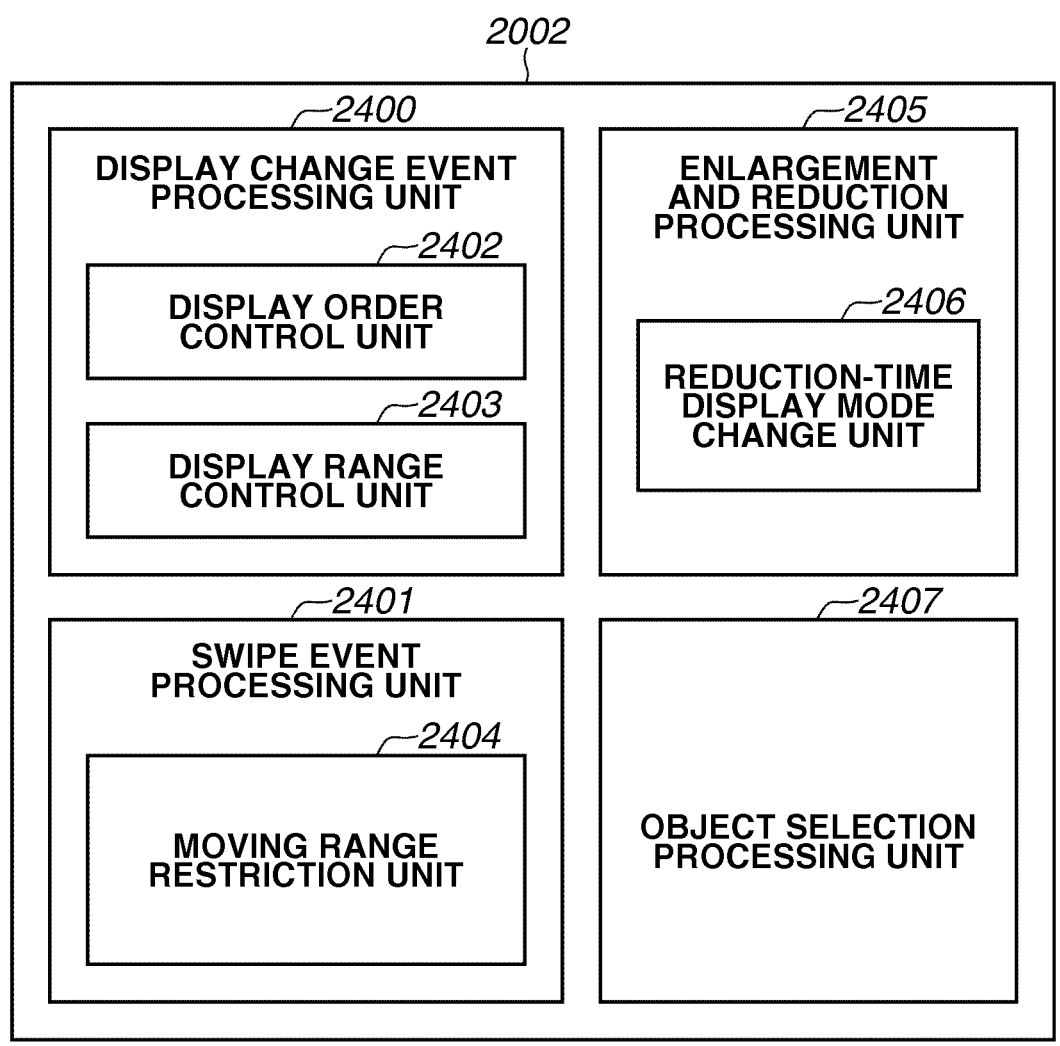
FIG. 24 is a block diagram illustrating a software module configuration related to operation control of the application image data.

FIG. 24 is a block diagram illustrating a software module configuration in the gesture event processing unit 2002 related to operation control of the application image data.

The gesture event processing unit 2002 receives gesture events illustrated in FIG. 21 from the gesture event generation unit 2001. A display change event processing unit 2400 processes the single-tap event (FIG. 21J) out of the gesture events received by the gesture event processing unit 2002. Upon reception of the single-tap event, the display change event processing unit 2400 determines whether coordinate values of the touch coordinates of the single-tap event correspond to any one of the "CHANGE MODE" button 2301, the "NEXT" button 2302, and the "PREVIOUS" button 2303 illustrated in FIG. 23. When touch coordinates of the single-tap event correspond to the "CHANGE MODE" button 2301, the display change event processing unit 2400 executes "mode change processing" (described below). When touch coordinates of the single-tap event correspond to the "NEXT" button 2302, the display change event processing unit 2400 executes "NEXT selection processing" (described below). When touch coordinates of the single-tap event correspond to the "PREVIOUS" button 2303, the display change event processing unit 2400 executes "PREVIOUS selection processing" (described below). The "NEXT selection processing" and the "PREVIOUS selection processing" are executed by the display order control unit 2402 and the display range control unit 2403 in the display change event processing unit 2400.

A swipe event processing unit 2401 processes the swipe event illustrated in FIG. 21B. Upon reception of the swipe event, the gesture event processing unit 2002 moves the starting point of the page 2300 in the coordinates on the touch UI 1904 according to the moving distance of the swipe event, and refreshes the screen display of the touch UI 1904. The moving range restriction unit 2404 in the swipe event processing unit 2401 performs moving range restriction processing (described below) to restrict the moving range of the page 2300 displayed on the touch UI 1904.

An enlargement and reduction processing unit 2405 processes the pinch-in event illustrated in FIG. 21C and the pinch-out event illustrated in FIG. 21D. Upon reception of the pinch-in or pinch-out event, the gesture event processing unit 2002 changes the display magnification of the page 2300 according to the reduction or enlargement rate of the two events, respectively, and refreshes the screen display of the touch UI 1904. A reduction-time display mode change unit 2406 in the enlargement and reduction processing unit 2405 executes reduction-time display mode change processing (described below).

An object selection processing unit 2407 processes the double-tap event illustrated in FIG. 21I. Upon reception of the double-tap event, the gesture event processing unit 2002 executes object selection processing (described below) by using coordinate values of the touch coordinates of the double-tap event. The object selection processing is controlled by the object selection event processing unit 2407 so that the processing is executed only in the page display mode.

Figure 25:
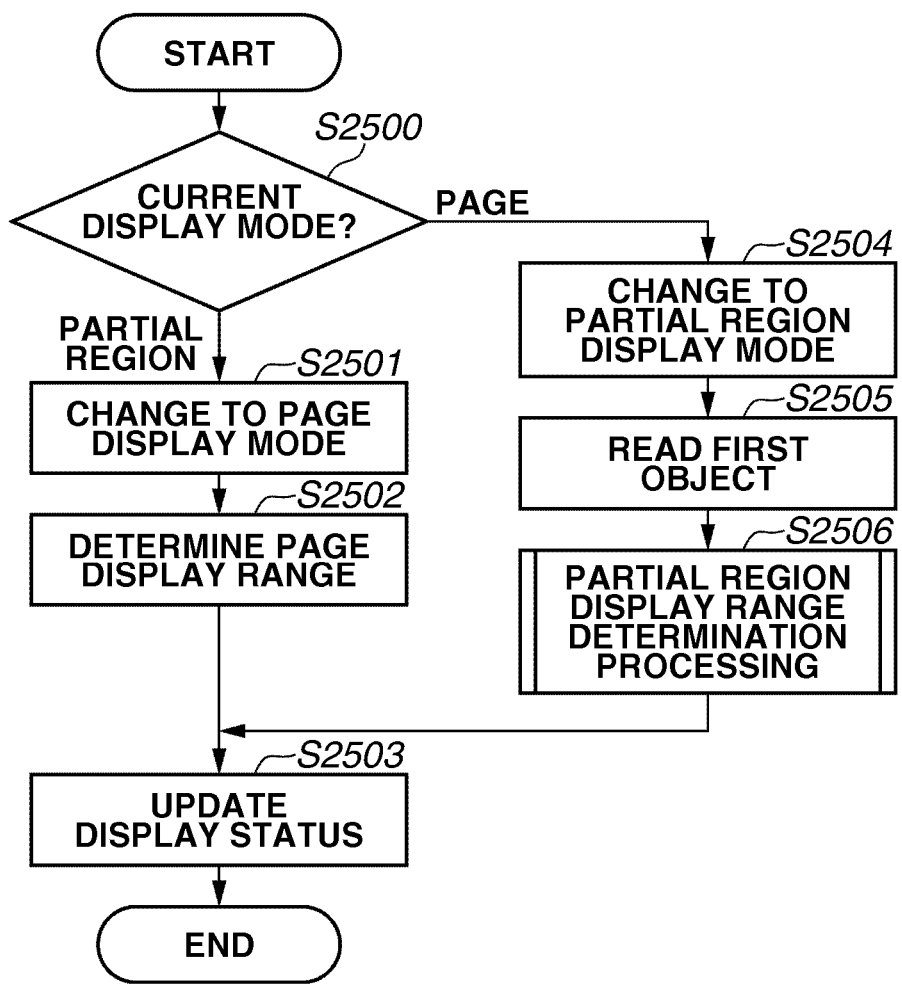
FIG. 25 is a flowchart illustrating mode change processing according to the first exemplary embodiment.

The mode change processing executed by the display change event processing unit 2400 will be described below with reference to FIGS. 23, 25, 26A, and 26B. FIG. 25 is a flowchart illustrating the mode change processing which is executed when the CHANGE MODE button 2301 is tapped by the user. FIGS. 26A and 26B illustrate example screen display of the touch UI 1904 of the PDA 107 according to the present exemplary embodiment.

In step S2500, the display change event processing unit 2400 acquires the display mode set in the PDA 107 when the CHANGE MODE button is tapped by the user. The display mode refers to a method used by the PDA 107 to display the application image data on the touch UI 1904 The PDA 107 according to the present exemplary embodiment has two display modes: the page display mode suitable for displaying the entire page and the partial region display mode suitable for enlarging a partial region in the page (i.e., each object in the page image) as illustrated in FIGS. 26A and 26B. As described above, the page display mode is set immediately after the PDA 107 receives the application image data. As illustrated in FIGS. 26A and 26B, the partial region display mode is a display mode in which the display magnification and the starting point of the page 2300 are controlled so that each object in the page 2300 is enlarged. The screen displayed when a text object 2601 is selected as an object to be enlarged is illustrated in FIG. 26B. A dotted line surrounding the object 2601 illustrated in FIG. 26A is drawn to help facilitate understanding of the description, and does not actually exist on the page 2300. In the present exemplary embodiment, as illustrated in FIG. 26B, only the target object is made easily viewable by superimposing a semi-transparent mask 2600 onto the page 2300. The semi-transparent mask 2600 is transparent for the region of the object 2601 to be enlarged and semi-transparent gray for the regions of other objects. Superimposing such a semi-transparent mask enables highlighting the target object and dimly displaying other objects, allowing the user to easily identifying the region of the target object. When the display mode set when the CHANGE MODE button 2301 is tapped is the partial region display mode (PARTIAL REGION in step S2500), the processing proceeds to step S2501. When the display mode at that time is the page display mode (PAGE in step S2500), the processing proceeds to step S2504.

In step S2501, the display change event processing unit 2400 sets not to display the semi-transparent mask 2600 illustrated in FIG. 26A (semi-transparent mask OFF), and changes the display mode to the page display mode.

In step S2502, the display change event processing unit 2400 controls the display magnification of the page 2300 according to the width of the touch UI 1904, as described above, and controls the starting point of the page 2300 to determine the page display range.

In step S2503, the display change event processing unit 2400 refreshes the screen display of the touch UI 1904 based on the determined page display range.

When the display mode set when the CHANGE MODE button 2301 is tapped is the page display mode (PAGE in step S2500), then in step S2504, the display change event processing unit 2400 changes the display mode to the partial region display mode, and sets to display the semi-transparent mask 2600 (semi-transparent mask ON).

In step S2505, the display change event processing unit 2400 reads the first object in the page 2300, and acquires the starting point, width, and height of the first object. The first object refers to an object which is read first in the document structure tree of the application image data.

In step S2506, the display range control unit 2403 in the display change event processing unit 2400 executes partial region display range determination processing (described below). In step S2503, the display range control unit 2403 refreshes the screen display of the touch UI 1904 based on the determined partial region display range. In the partial region display range determination processing in step S2506, the display change event processing unit 2400 controls the display magnification and the starting point of the page according to the attribute of the object (read in step S2505) to determine a display range of the partial region to be displayed on the touch UI 1904. The partial region display range determination processing will be described in detail below. In this case, a semi-transparent (gray) mask is applied to regions other than the partial region of the target object, allowing the user to easily identify the target object.

Figure 27:
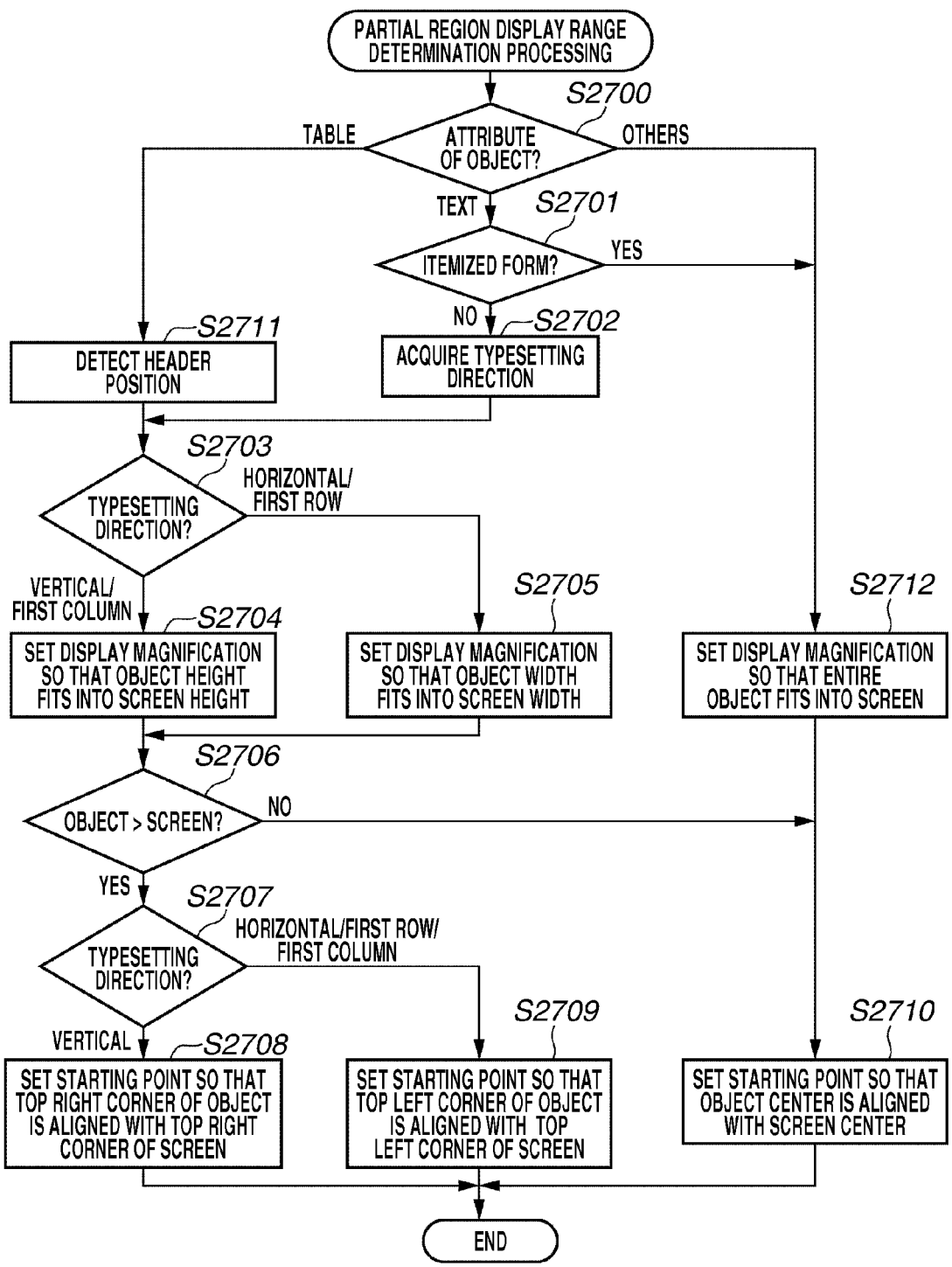
FIG. 27 is a flowchart illustrating partial region display range determination processing according to the first exemplary embodiment.

The partial region display range determination processing executed by the display range control unit 2403 in step S2506 will be described with reference to the flowchart illustrated in FIG. 27.

In step S2700, the display range control unit 2403 determines the attribute of the read object. When the attribute is determined to be text (TEXT in step S2700), the processing proceeds to step S2701. When the attribute is determined to be table (TABLE in step S2700), the processing proceeds to step S2711. Otherwise, when the attribute is determined to be others (OTHERS in step S2700), the processing proceeds to step S2712.

In step S2701, the display range control unit 2403 determines whether the object to be displayed (hereinafter referred to as display target object), having the text attribute, is in itemized form. An object in itemized form refers to an object having a point or numeral as a line head character for each character string or row. The line head character can be acquired from the result of the OCR processing. When the object is determined not to be in itemized form but to be an ordinary character string (NO in step S2701), the processing proceeds to step S2702. Otherwise, when the object is determined to be in itemized form (YES in step S2701), the processing proceeds to step S2712.

In step S2702, the display range control unit 2403 acquires the text typesetting direction of the object. The typesetting direction of the object has been acquired in the vectorization processing in step S304.

In step S2703, the display range control unit 2403 determines the typesetting direction. When the typesetting direction is vertical (VERTICAL/FIRST COLUMN in step S2703), the processing proceeds to step S2704. Otherwise, when the typesetting direction is horizontal (HORIZONTAL/FIRST ROW in step S2703), the processing proceeds to step S2705.

In step S2704 (when the text typesetting direction is vertical), the display range control unit 2403 sets the display magnification of the page so that the height of the relevant object fits into the height of the touch UI 1904.

In step S2705 (when the text typesetting direction is horizontal), the display range control unit 2403 sets the display magnification of the page so that the width of the relevant object fits into the width of the touch UI 1904.

In step S2706, the display range control unit 2403 determines whether the entire object which has been reduced to the display magnification set in step S2704 or S2705 can be displayed on the touch UI 1904. When the entire object is determined to be larger than the touch UI 1904 and the entire object cannot be displayed thereon (YES in step S2706), the processing proceeds to step S2707. Otherwise, when the entire object is determined not to be larger than the touch UI

1904 and the entire object can be displayed thereon (NO in step S2706), the processing proceeds to step S2710.

In step S2707, the display range control unit 2403 determines the text typesetting direction of the relevant object. When the text typesetting direction is determined to be vertical (VERTICAL in step S2707), the processing proceeds to step S2708. Otherwise, when the text typesetting direction is determined to be horizontal (HORIZONTAL/FIRST ROW/FIRST COLUMN in step S2707) the processing proceeds to step S2709.

In step, S2708, the display range control unit 2403 sets the starting point position of the above-described page 2300 so that the top right corner of the relevant object is aligned with the top right corner of the touch UI 1904 since the entire object displays the vertical text region which cannot be displayed on the touch UI 1904. Specifically, the display range control unit 2403 sets the display position so that the first row for vertical writing is displayed.

In step S2709, the display range control unit 2403 displays the horizontal text region which cannot be displayed on the touch UI 1904, and, therefore, sets the starting point of the page 2300 so that the top left corner of the relevant object is aligned with the top left corner of the touch UI 1904. Specifically, the display range control unit 2403 sets the display position so that the first row for horizontal writing is displayed.

In step S2710, since the entire object fits into the screen of the touch UI 1904, the display range control unit 2403 sets the starting point of the page 2300 so that the center of the relevant object is aligned with the center of the touch UI 1904.

When the attribute of the object is determined to be table (TABLE in step S2700), then in step S2711, the display range control unit 2403 detects a header position of the table. The header position can be determined, for example, based on whether the font type of the character of the first row (top row) and the first column (leftmost column) is bold, the thickness of the approximation curve of the vector data at the time of vectorization, the thickness of the table ruled line, and the background color of each cell in the table. When the header position of the table detected in step S2711 is determined to be the first row (HORIZONTAL/FIRST ROW in step S2703), the processing proceeds to step S2705 from step S2703. Otherwise, when the header position of the table is determined to be the first column (VERTICAL/FIRST COLUMN in step S2703), the processing proceeds to step S2704 from step S2703. Since the table header commonly exists at the top row or leftmost column (HORIZONTAL/FIRST ROW/FIRST COLUMN in step S2707), the processing proceeds to step S2709. In step S2709, the display range control unit 2403 sets the starting point of the page so that the top left corner of the object is aligned with the top left corner of the touch UI. Thus, the display position is set so that the table header is displayed.

When the attribute of the object is determined to be others (attributes other than text and table, i.e., OTHERS in step S2700) or when the object is determined to be in itemized form (YES in step S2701), then in step S2712, the display range control unit 2403 sets the display magnification of the page so that the entire relevant object fits into the touch UI 1904. In step S2710, the display range control unit 2403 sets the starting point of the page 2300 so that the center of the object is aligned with the center of the touch UI 1904.

Figure 28:
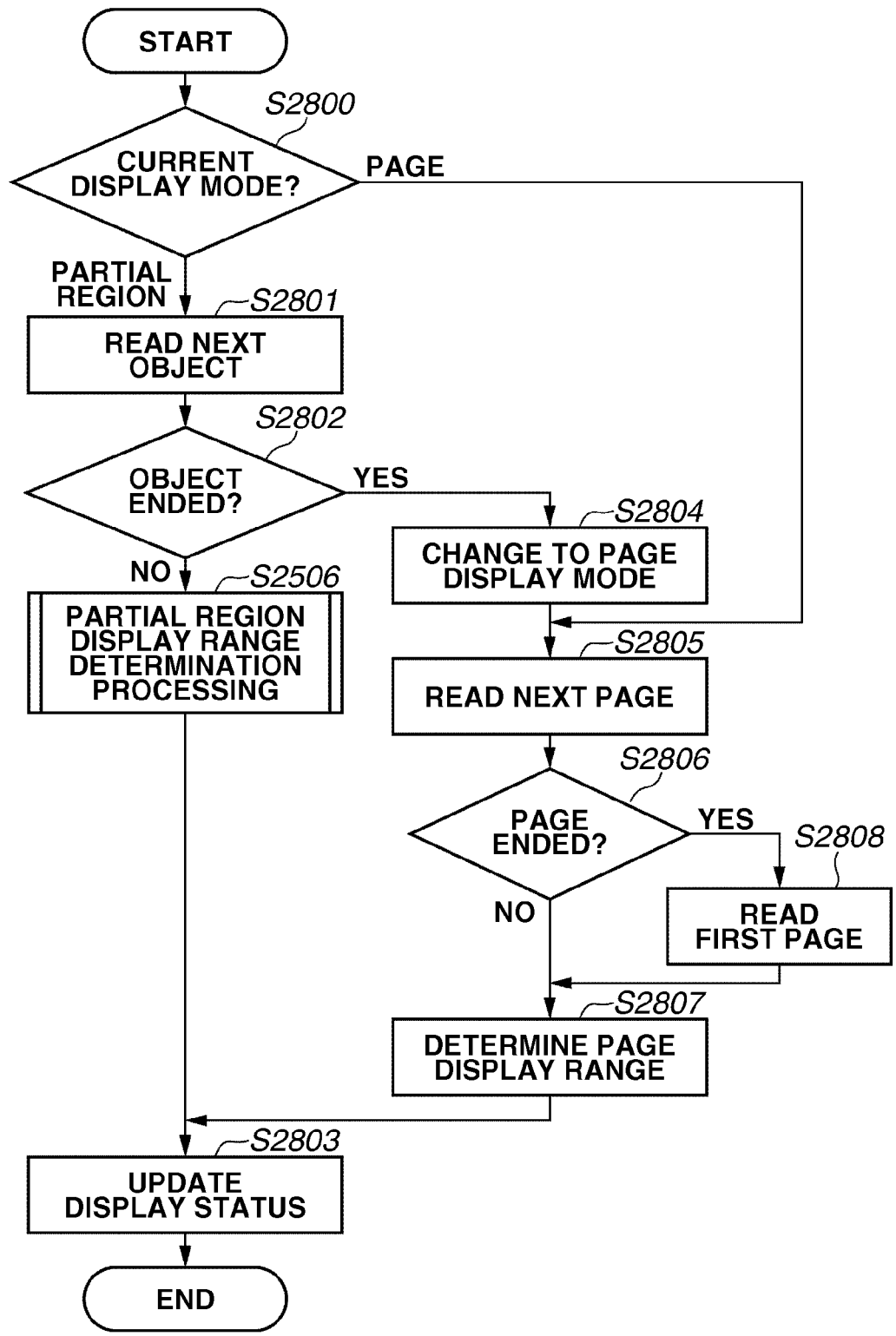
FIG. 28 is a flowchart illustrating next object selection processing according to the first exemplary embodiment.

The "NEXT selection processing" executed when the "NEXT" button 2302 is tapped (instructed) by the user will be described below with reference to the flowchart illustrated in FIG. 28.

In step S2800, the display change event processing unit 2400 acquires the display mode set in the PDA 107 when the "NEXT" button 2302 is tapped. When the acquired display mode is the partial region display mode (PARTIAL REGION in step S2800), the processing proceeds to step S2801. Otherwise, when the acquired display mode is the page display mode (PAGE in step S2800), the processing proceeds to step S2805.

In step S2801, the display order control unit 2402 selects a next display target object based on the document structure tree, out of all of the read objects of the page, and read the relevant object. In the present exemplary embodiment, objects on the document tree structure are displayed from the highest hierarchical level downward, specifically, in order of an object belonging to the first highest hierarchical level, an object belonging to the second hierarchical level, and so on. When all of objects belonging to the lower hierarchical levels have been displayed, objects are displayed from a higher hierarchical level downward, specifically, in order of an object belonging to the next higher hierarchical level, an object belonging to the lower hierarchical level, and so on. For example, referring to FIG. 17, a page V0 has an object H1 which is read first. When the "NEXT selection processing" is performed when the object H1 is displayed on the touch UI 1904 in the partial region display mode, an object T1 belonging to the lower (second) hierarchical level is read. When the "NEXT selection processing" is performed when the object T1 is displayed, an object T2 existing in the same hierarchical level as the object T1 is read since the object T1 does not have a lower hierarchical level. When the "NEXT selection processing" is performed when the object T2 is displayed, a second object S1 belonging to the highest hierarchical level is read since the object T2 does not have a lower hierarchical level and no more object exists in the relevant hierarchical level. Although, in the present exemplary embodiment, the object H1 not having a drawing element is selected and read, of course, only the drawing elements T1 and T2 having a drawing element may be selected. Further, only an object having a specific attribute, for example, the text attribute may be selected, or a specific attribute may be excluded.

In step S2802, the display order control unit 2402 determines whether the next object has been read in step S2801. When the next object is determined to have been read in step S2801 (when a selectable object exists, i.e., NO in step S2802), the processing proceeds to step S2506 to process the read object. The partial region display range determination processing in step S2506 is similar to the processing illustrated in FIG. 27, and redundant description thereof will be omitted. In step S2803, the display order control unit 2402 refreshes the screen display of the touch UI 1904 by using the display magnification and the starting point of the page controlled based on the attribute, starting point, width, and height of the read object.

Otherwise, when the next object is determined not to have been read in step S2801 (when no selectable object exists, i.e., YES in step S2802), the display order control unit 2402 determines that the last object in the page has already been read and the display processing is completed for all objects in step S2802, and the processing proceeds to step S2804. In step S2804, the display order control unit 2402 exits the partial region display mode, sets not to display the semi-transparent mask 2600, and changes the display mode to the page display mode.

In step S2805, since the page display mode is entered, the display order control unit 2402 analyzes the syntax of the application image data stored in the RAM 1911, and reads the next page and objects contained therein.

In step S2806, the display order control unit 2402 determines whether the next page has been read. When the next page has been read in step S2805 (NO in step S2806), the processing proceeds to step S2807. Otherwise, when the last page of the application image data stored in the RAM 1911 has already been read and the next page has not been read in step S2805 (YES in step S2806), the processing proceeds to step S2808. In step S2808, the display order control unit 2402 analyzes the syntax of the application image data stored in the RAM 1911, and reads the first page and objects contained therein.

In step S2807, the display range control unit 2403 controls the display magnification of the page according to the width of the touch UI 1904, as described above, controls the starting point of the page, and determines the page display range. In step S2803, the display range control unit 2403 refreshes the screen display of the touch UI 1904 based on the determined page display range.

Figure 29:
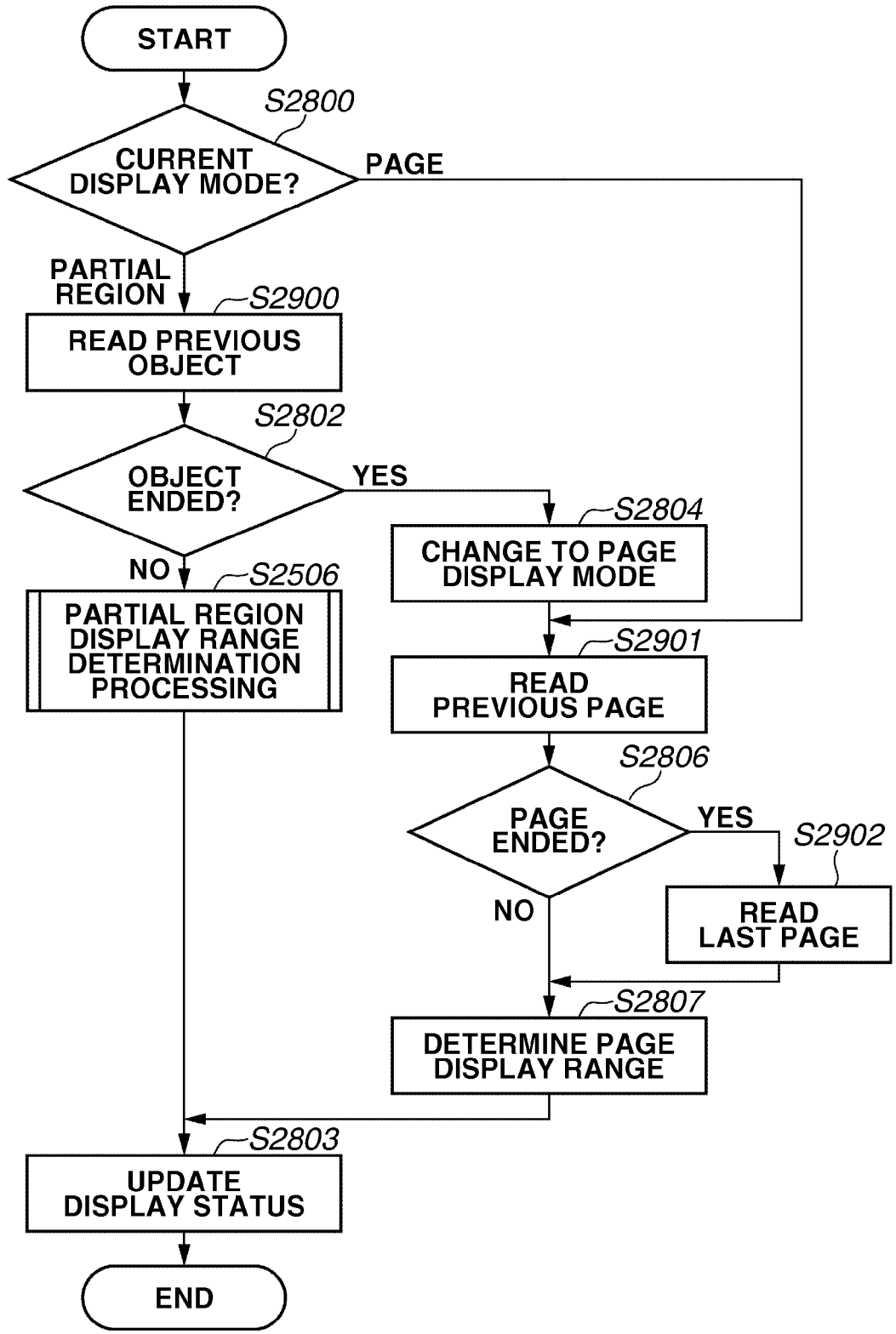
FIG. 29 is a flowchart illustrating previous object selection processing according to the first exemplary embodiment.

The "PREVIOUS selection processing" executed when the "PREVIOUS" button 2302 is tapped (instructed) by the user will be described below with reference to the flowchart illustrated in FIG. 29.

The PREVIOUS selection processing has almost the same configuration as the above-described NEXT selection processing, and redundant description thereof will be omitted and only different portions (steps S2900, S2901, and S2902) will be described below.

In step S2900, the display order control unit 2402 selects a next display target object based on the document structure tree, out of the currently read objects, and reads the relevant object. In the present exemplary embodiment, when the "PREVIOUS" button 2302 is tapped, objects on the document tree structure are displayed from the lowest hierarchical level upward, specifically, in order of objects belonging to the lowest hierarchical level, objects belonging to the second lowest hierarchical level, and so on. When all of objects belonging to a lower hierarchical level have been displayed, objects belonging to the higher hierarchical level are displayed. For example, referring to FIG. 17, a last object T7 belonging to the lowest hierarchical level is read first. In the partial region display mode, when the "PREVIOUS selection processing" is performed when the object T7 is displayed on the touch UI 1904, an object T6 existing in the same hierarchical level is read. Further, when the "PREVIOUS selection processing" is performed when the object T6 is displayed, since no other objects exist in the same hierarchical level, an object V2 belonging to the higher hierarchical level is read. When the "PREVIOUS selection processing" is performed when the object V2 is displayed, since an object V1 exists in the same hierarchical level and has objects in the lower hierarchical level, a last object T5 belonging to the lower hierarchical level of the object V1 is read. Also in the "PREVIOUS selection processing", similar to the "NEXT selection processing", it is also possible to select only objects having a drawing element, select only objects having a specific attribute, and deselect only objects having a specific attribute.

The moving range restriction processing executed by the moving range restriction unit 2404 will be described below with reference to the flowchart illustrated in FIG. 30.

In step S3000, the moving range restriction unit 2404 acquires the display mode set in the PDA 107 when the swipe operation is performed, and determines whether the display mode is the partial region display mode. When the display mode is determined to be the partial region display mode (PARTIAL REGION in step S3000), the processing proceeds to step S3001. Otherwise, when the display mode is determined to be the page display mode (PAGE in step S3000), the processing exits the flowchart.

When the display mode is determined to be the partial region display mode (PARTIAL REGION in step S3000), then in step S3001, the moving range restriction unit 2404 determines whether the width of the currently read object when displayed with the display magnification for the current page is larger than the width of the screen of the touch UI 1904. When the width of the relevant object is larger than the screen width of the touch UI 1904 (YES in step S3001), the processing proceeds to step S3002. Otherwise (NO in step S3001), the processing proceeds to step S3004.

In step S3002, the moving range restriction unit 2404 determines whether the left or right end of the object has moved into the screen of the touch UI 1904 when the swipe event processing unit 2401 moves the display position of the page containing the relevant object according to the moving distance of the swipe event. When the left or right end of the object is determined to be within the screen of the touch UI 1904 (YES in step S3002), the processing proceeds to step S3003. Otherwise (NO in step S3002), the processing proceeds to step S3006.

In step S3003, the moving range restriction unit 2404 corrects the X-coordinate of the starting point of the page to move the left or right end of the relevant object, which has moved into the screen, respectively to the left or right end of the screen of the touch UI 1904 so that the relevant object is displayed as much as possible.

When the width of the relevant object is determined not to be larger than the screen width of the touch UI 1904 (NO in step S3001), then in step S3004, the moving range restriction unit 2404 determines whether the left or right end of the object has moved out of the screen of the touch UI 1904 when the swipe event processing unit 2401 moves the display position of the page containing the relevant object according to the moving distance of the swipe event. When the left or right end of the relevant object is determined to be out of the screen of the touch UI 1904 (YES in step S3004), the processing proceeds to step S3005. Otherwise (NO in step S3004), the processing proceeds to step S3006.

In step S3005, the moving range restriction unit 2404 corrects the X-coordinate of the starting point of the page to move the left or right end of the relevant object respectively to the left or right end of the screen so that the entire relevant object is displayed.

In step S3006, the moving range restriction unit 2404 determines whether the height of the currently read object when displayed with the display magnification for the current page is larger than the height of the screen of the touch UI 1904. When the height of the relevant object is determined to be larger than the screen height of the touch UI 1904 (YES in step S3006), the processing proceeds to step S3007. Otherwise (NO in step S3006), the processing proceeds to step S3009.

In step S3007, the moving range restriction unit 2404 determines whether the top or bottom end of the object has moved into the screen of the touch UI 1904 when the swipe event processing unit 2401 moves the display position of the page containing the relevant object according to the moving distance of the swipe event. When the top or bottom end of the object is determined to be within the screen of the touch UI 1904 (YES in step S3007), the processing proceeds to step S3008. Otherwise (NO in step S3007), the processing proceeds to step S3011.

In step S3008, the moving range restriction unit 2404 corrects the Y-coordinate of the starting point of the page to move the top or bottom end of the relevant object, which has moved into the screen, respectively to the top or bottom end of the screen so that the relevant object is displayed as much as possible.

When the height of the relevant object is determined not to be larger than the screen height of the touch UI 1904 (NO in step S3006), then in step S3009, the moving range restriction unit 2404 determines whether the top or bottom end of the object has moved out of the screen of the touch UI 1904 when the swipe event processing unit 2401 moves the display position of the page containing the relevant object according to the moving distance of the swipe event. When the top or bottom end of the object is determined to have moved out of the screen of the touch UI 1904 (YES in step S3009), the processing proceeds to step S3010. Otherwise (NO in step S3009), the processing proceeds to step S3011.

In step S3010, the moving range restriction unit 2404 corrects the Y-coordinate of the starting point of the page to move the top or bottom end of the relevant object into the screen so that the entire relevant object is displayed.

In step S3011, the display change event processing unit 2400 refreshes the screen display of the touch UI 1904 according to the display magnification and the starting point of the page.

Thus, the user can easily identify the end of the object by restricting the moving range of the object.

Figure 31:
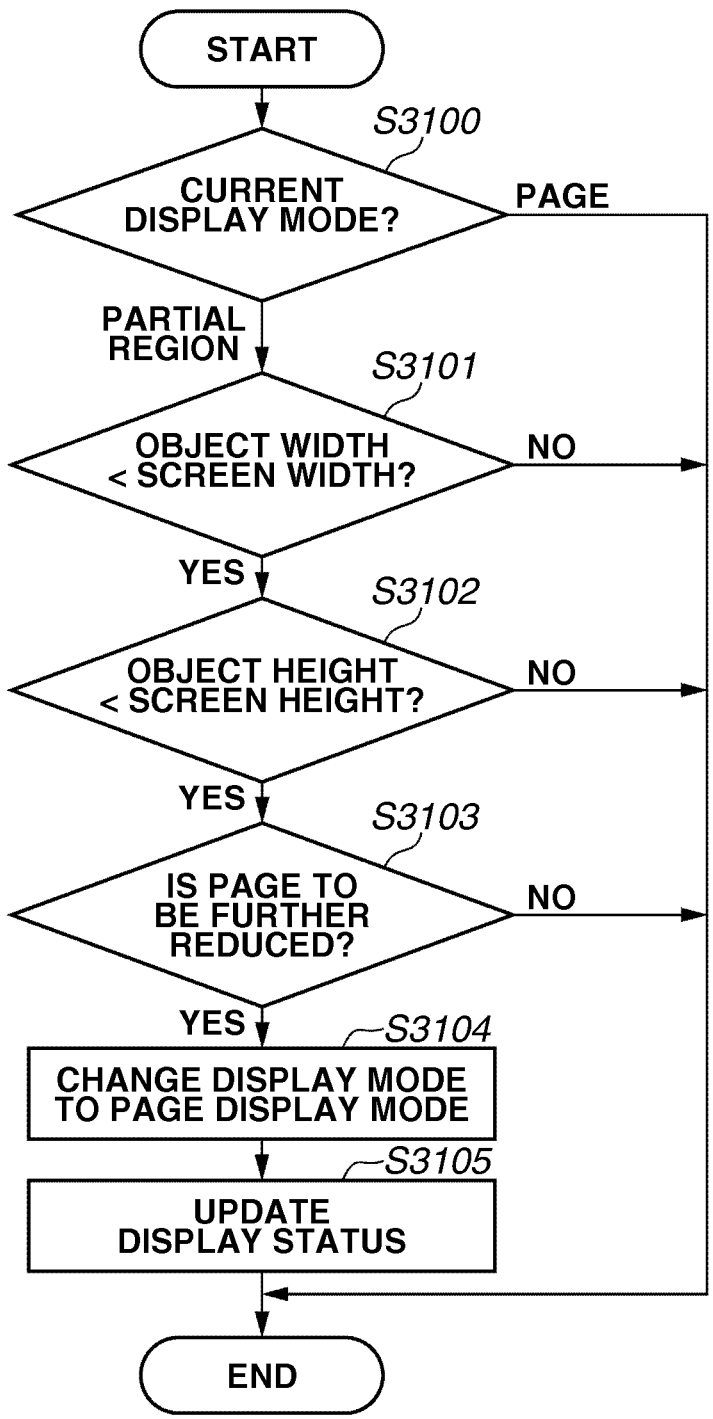
FIG. 31 is a flowchart illustrating reduction-time display mode change processing according to the first exemplary embodiment.

The reduction-time display mode change processing executed by the reduction-time display mode change unit 2406 when the pinch-in operation is performed will be described below with reference to the flowchart illustrated in FIG. 31.

In step S3100, the reduction-time display mode change unit 2406 acquires the display mode set in the PDA 107 when the pinch-in operation is performed by the user. When the acquired display mode is determined to be the partial region display mode (PARTIAL REGION in step S3100), the processing proceeds to step S3101. Otherwise, when the display mode is determined to be the page display mode (PAGE in step S3100), the processing exits the flowchart.

In step S3101, the reduction-time display mode change unit 2406 determines whether the width of the currently read object when displayed with the display magnification for the current page is smaller than the width of the screen of the touch UI 1904. When the width of the relevant object is determined to be smaller than the screen width of the touch UI 1904 (YES in step S3101), the processing proceeds to step S3102. Otherwise (NO in step S3101), the processing exits the flowchart.

In step S3102, the reduction-time display mode change unit 2406 determines whether the height of the currently read object when displayed with the display magnification for the current page is smaller than the height of the screen of the touch UI 1904. When the height of the relevant object is determined to be smaller than the screen height of the touch UI 1904 (YES in step S3102), the processing proceeds to step S3103. Otherwise (NO in step S3102), the processing exits the flowchart.

In step S3103, the reduction-time display mode change unit 2406 determines whether the display magnification of the page containing the relevant object is to be further reduced. Specifically, the reduction-time display mode change unit 2406 determines whether the received event is the pinch-in event. When the page is to be further reduced (YES in step S3103), the processing proceeds to step S3104. Otherwise (NO in step S3103), the processing exits the flowchart.

In step S3104, the reduction-time display mode change unit 2406 sets not to display the semi-transparent mask 2600, and changes the display mode of the PDA 107 from the partial region display mode to the page display mode.

In step S3105, the display change event processing unit 2400 refreshes the screen display of the touch UI 1904 according to the display magnification and the starting point of the page determined based on the pinch-in event.

Figure 32:
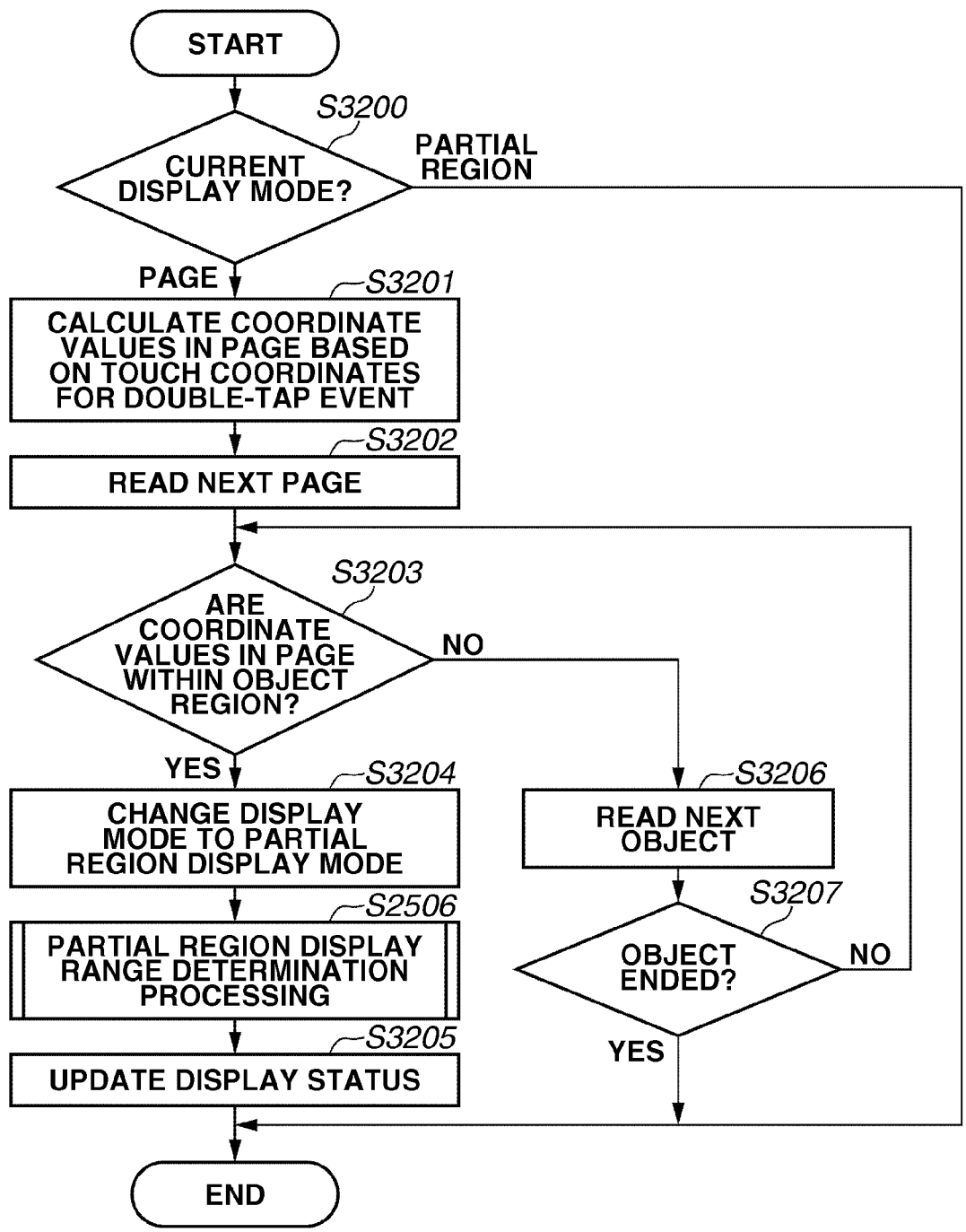
FIG. 32 is a flowchart illustrating object selection processing according to the first exemplary embodiment.

The object selection processing executed by the object selection processing unit 2407 when the double-tap operation is performed will be described below with reference to the flowchart illustrated in FIG. 32.

In step S3200, the object selection processing unit 2407 acquires the display mode set in the PDA 107 when the double-tap operation is performed by the user. When the acquired display mode is determined to be the page display mode (PAGE in step S3200), the processing proceeds to step S3201. Otherwise, when the display mode is determined to be the partial region display mode (PARTIAL REGION in step S3200), the processing exits the flowchart.

In step S3201, the object selection processing unit 2407 acquires coordinate values of the touch coordinates for the received double-tap event. Since the coordinate values of the touch coordinates are coordinate values on the touch UI 1904, the object selection processing unit 2407 converts them into coordinate values in the page based on the display magnification and the starting point of the page displayed on the touch UI 1904.

In step S3202, the object selection processing unit 2407 reads information about the first object out of all of objects in the current page displayed on the touch UI 1904.

In step S3203, the object selection processing unit 2407 determines whether coordinate values in the page acquired in step S3201 are included in the region information of the read object. When the coordinate values in the page are included in the region information of the read object (YES in step 3203), the processing proceeds to step S3204. Otherwise (NO in step S3203), the processing proceeds to step S3206.

In step S3204, the object selection processing unit 2407 changes the display mode of the PDA 107 from the page display mode to the partial region display mode. At the same time, the object selection processing unit 2407 displays the semi-transparent mask 2600 to apply a semi-transparent mask to the ranges other than the double-tapped object, and the processing proceeds to step S2506.

In step S2506, the object selection processing unit 2407 performs the partial region display range determination processing for the object (the double-tapped object) read in step S3202 or S3206. The partial region display range determination processing is as described above, and redundant description thereof will be omitted.

In step S3205, the display change event processing unit 2400 refreshes the screen display of the touch UI 1904 according to the display magnification and the starting point of the page determined in the partial region display range determination processing.

In step S3206, the object selection processing unit 2407 reads information about an object next to the currently read object out of all of objects in the current page.

In step S3207, the object selection processing unit 2407 determines whether the next object has been read in step S3206. When the next object is determined to have been read (NO in step S3207), the processing returns to step S3203.

Otherwise, when the next object is determined not to have been read (YES in step 3207), the processing exits the flowchart.

Although, in the present exemplary embodiment, the object selection processing unit 2407 determines whether coordinate values in the page are included in the region information of each object for all of objects in the page currently displayed on the touch UI 1904, the processing is not limited thereto. For example, similar to the PREVIOUS selection processing and the NEXT selection processing, it is also possible to ignore objects not having a drawing element and select only objects having a drawing element. Further, it is also possible to select only objects having a specific attribute (such as objects having the text attribute) and deselect only objects having a specific attribute.

Display processing in the partial region display mode according to the present exemplary embodiment will be described below with reference to FIGS. 26A, 26B, 33A, 33B, 34A, and 34B. FIGS. 33A, 33B, 34A, and 34B illustrate example screen display of the touch UI 1904 of the PDA 107 according to the present exemplary embodiment.

Referring to FIGS. 26A and 26B, the object 2601 is an object having the text attribute for horizontal writing. The object 2601 has region information enclosed by the broken line illustrated in FIG. 26A. Since the object 2601 has the text attribute, immediately after the object 2601 is read, the display magnification of the page is set to a magnification with which the width of the relevant object fits into the screen width of the touch UI 1904 in the above-described partial region display range determination processing. With the set display magnification of the page, since the height of the object 2601 is smaller than the screen height of the touch UI 1904, the starting point of the page is set so that the center of the relevant object is aligned with the center of the touch UI 1904 and the page is displayed as illustrated in FIG. 26B.

Figure 33B:
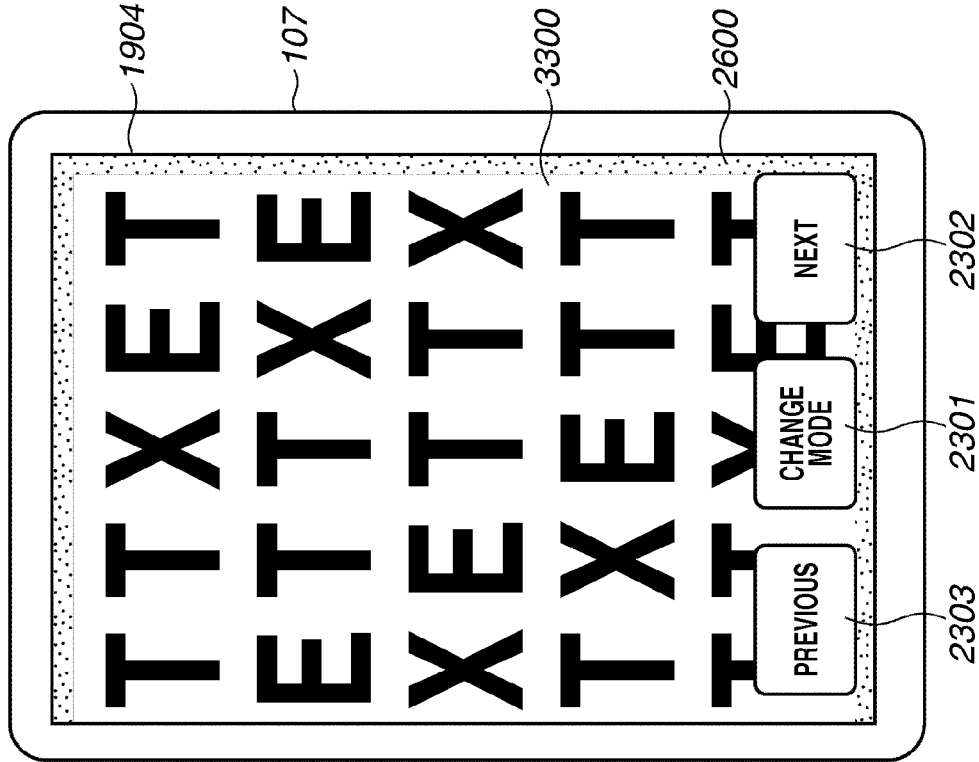
FIGS. 33A and 33B illustrate example screen display of the touch UI of the PDA.
Figure 33A:
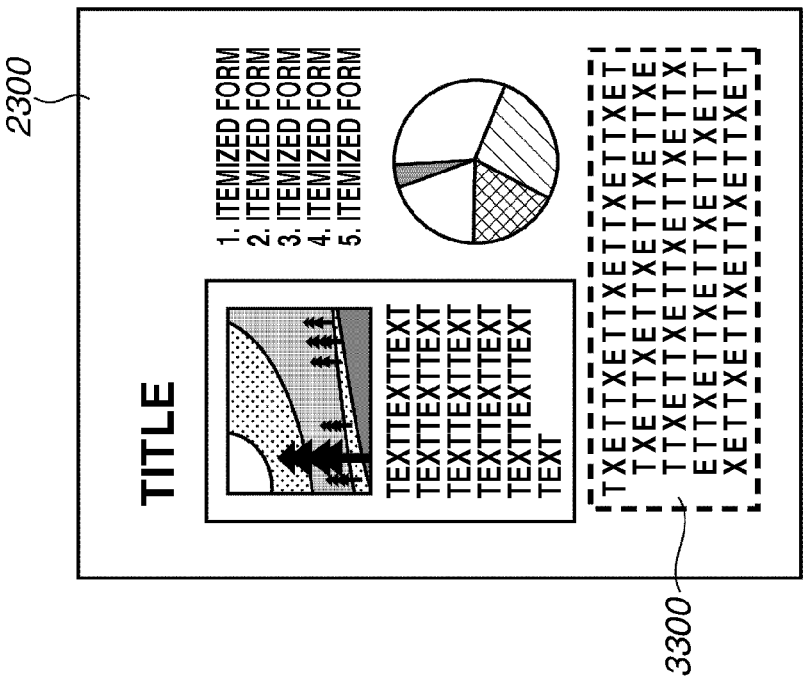

Referring to FIGS. 33A and 33B, an object 3300 is an object having the text attribute for vertical writing. The object 3300 has region information enclosed by the broken line illustrated in FIG. 33A. Since the object 3300 has the text attribute, immediately after the object 3300 is read, the display magnification of the page is set to a magnification with which the height of the relevant object fits into the screen height of the touch UI 1904 in the above-described partial region display range determination processing. With the set display magnification of the page, since the width of the object 3300 is larger than the screen width of the touch UI 1904, the starting point of the page is set so that the top right corner of the relevant object is aligned with the top right corner of the touch UI 1904 and the page is displayed as illustrated in FIG. 33B.

Referring to FIGS. 34A and 34B, the object 3400 is an object having the graphic attribute. The object 3400 has region information enclosed by the broken line illustrated in FIG. 34A. Since the object 3400 has the graphic attribute, immediately after the object 3400 is read, the display magnification of the page is set to a magnification with which the width and height of the relevant object respectively fit into the screen width and height of the touch UI 1904 in the above-described partial region display range determination processing. Further, the starting point of the page is set so that the center of the relevant object is aligned with the center of the touch UI 1904, and as illustrated in FIG. 34B.

Example restrictions in the above-described moving range restriction processing according to the present exemplary embodiment will be described below with reference to FIGS. 34A, 34B, 35A, 35B, 35C, 36A, 36B, and 36C. FIGS. 35A, 35B, 35C, 36A, 36B, and 36C illustrate example screen display of the touch UI 1904 of the PDA 107 according to the present exemplary embodiment.

FIG. 35A illustrates example screen display when the object 3400 is displayed on the touch UI 1904. Referring to FIG. 35A, the width and height of the object 3400 are respectively smaller than the screen width and height of the touch UI 1904 so that the object 3400 fits into the screen of the touch UI 1904. FIG. 35B illustrates example screen display when the user's finger performs the swipe operation ranging from a position 3500 to a position 3501 (i.e., from left to right). Upon each reception of the swipe event, the swipe event processing unit 2401 moves the starting point of the page by the moving distance, and refreshes the screen display of the touch UI 1904. Referring to FIG. 35B, the left end of the object 3400 has moved out of the screen of the touch UI 1904 by the user's swipe operation. FIG. 35C illustrates example screen display of the touch UI 1904 after the starting point of the page is corrected to move the object 3400 (whose left end was once moved out of the screen by the swipe event processing unit 2401 as illustrated in FIG. 35B) back into screen through the above-described moving range restriction processing. Specifically, since the width and height of the object 3400 are respectively smaller than the screen width and height of the touch UI 1904, when the object 3400 is moved out of the screen, the starting point of the page is corrected by the moving range restriction processing so that the entire object 3400 is displayed within the screen.

FIG. 36A illustrates example screen display of the touch UI 1904 after the object 3400 is enlarged by the pinch-out operation. Referring to FIG. 36A, since the width of the object 3400 displayed is larger than the screen width of the touch UI 1904, the right and left ends of the object 3400 are displayed out of the screen of the touch UI 1904, and the top and bottom ends are displayed within the screen. FIG. 36B illustrates example screen display when the user's finger performs the swipe operation ranging from a position 3600 to a position 3601 (i.e., from right to left). Upon each reception of the swipe event, the swipe event processing unit 2401 moves the starting point of the page by the moving distance, and refreshes the screen display of the touch UI 1904. Referring to FIG. 36B, the right end of the object 3400 has moved into the screen of the touch UI 1904 by the user's swipe operation. FIG. 36C illustrates example screen display of the touch UI 1904 after the starting point of the page is corrected to move the object 3400 (whose right end was once moved into the screen by the swipe event processing unit 2401 as illustrated in FIG. 36B) so that the right end of the object 3400 is almost aligned with the right end of the screen of the touch UI 1904 through the above-described moving range restriction processing. Specifically, since the width of the object 3400 is larger than the screen width of the touch UI 1904, when the right or left end of the object 3400 is moved into the screen, the starting point of the page is corrected through the moving range restriction processing so that the right or left end of the relevant object is respectively aligned with the right or left end of the screen so that the relevant object is displayed as much as possible.

In the present exemplary embodiment, the MFP 100 transmits to the PDA 107 the application image data to be displayed thereon, and the PDA 107 receives the application image data. However, of course, it is also possible to generate an application which can be executed by the PDA 107 storing the application image data therein, and distribute the application to the PDA 107. The application which can be executed by the PDA 107 includes the gesture event processing unit 2002 (software module described in the present exemplary embodiment) which controls the application image data.

Further, the MFP 100 may transmit the generated application image data to the document management server 106, and transmit an address indicating the location of the application image data to the PDA 107. In this case, the PDA 107 does not have the entity of the application image data, but acquires, as required, page and object information from the database 105 storing data of the document management server 106 and displays the information.

As described above, the present exemplary embodiment enables browsing a page by freely scrolling, enlarging, and reducing an object through the swipe and pinch-operations, and, in the partial region display mode, displaying only a desired object in an easily viewable form according to its contents. The present exemplary embodiment further enables successively displaying suitable ranges in the page in a suitable order only by operating the "NEXT" and "PREVIOUS" buttons, allowing the user to easily read information in the page without performing delicate adjustment. When moving an object with the swipe operation in the partial region display mode, the present exemplary embodiment restricts the moving range of the relevant object based on end positions of the relevant object, allowing the user to easily recognize the range of the relevant object. Thus, the user is able to clearly distinguish the relevant object from other ones.

In a second exemplary embodiment of the present invention, when the moving range restriction unit 2404 restricts the moving range of an object, it once restricts the moving range and then cancels the restriction of the moving range. Therefore, when the user instructs again to move the relevant object out of the range, it can be moved.

Figure 30:
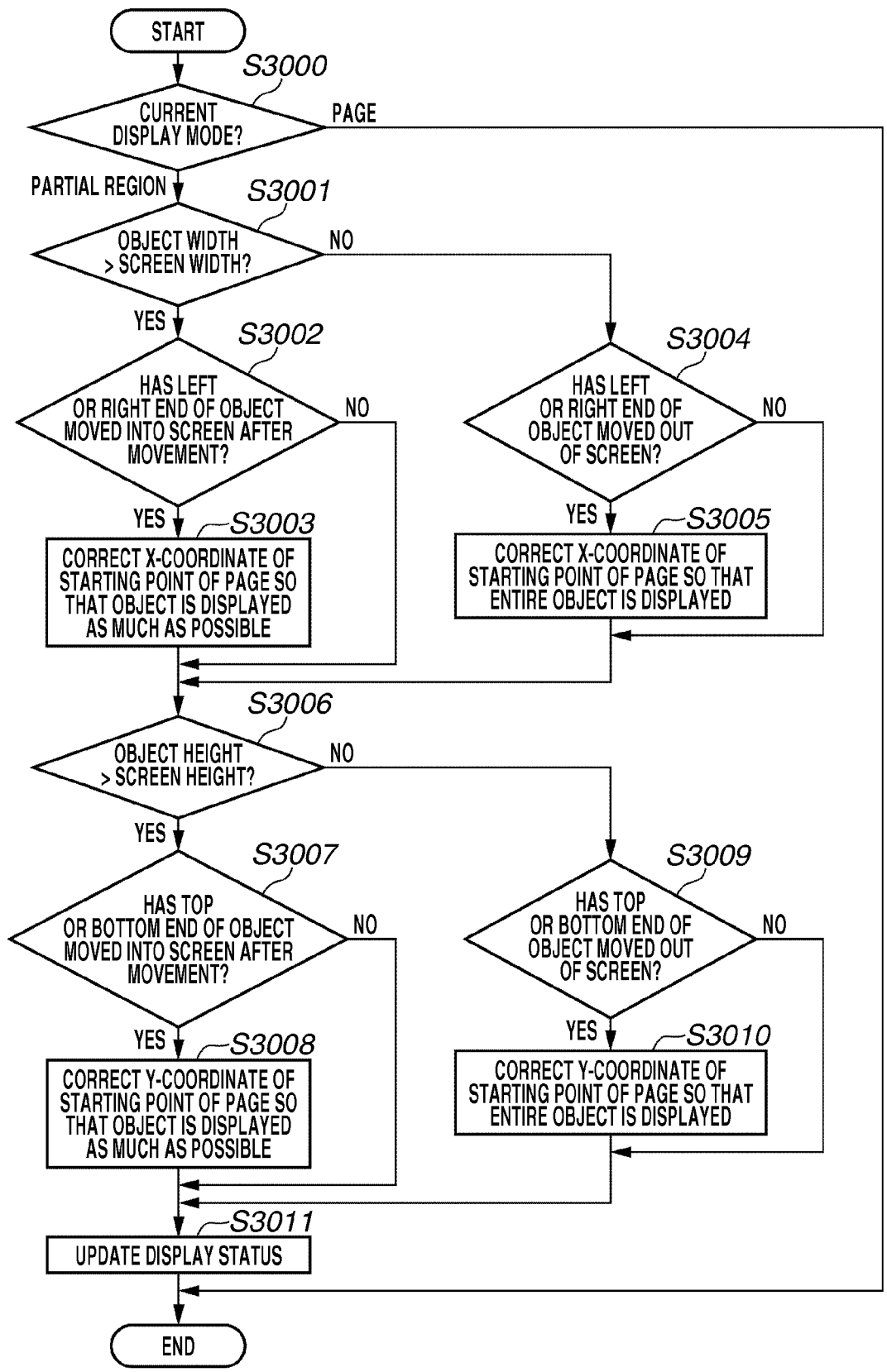
FIG. 30 is a flowchart illustrating moving range restriction processing according to the first exemplary embodiment.

The second exemplary embodiment differs from the above-described first exemplary embodiment only in a part of the moving range restriction processing illustrated in FIG. 30. Therefore, similar portions are assigned identical reference numerals, and only different portions will be described below.

Figure 37A:
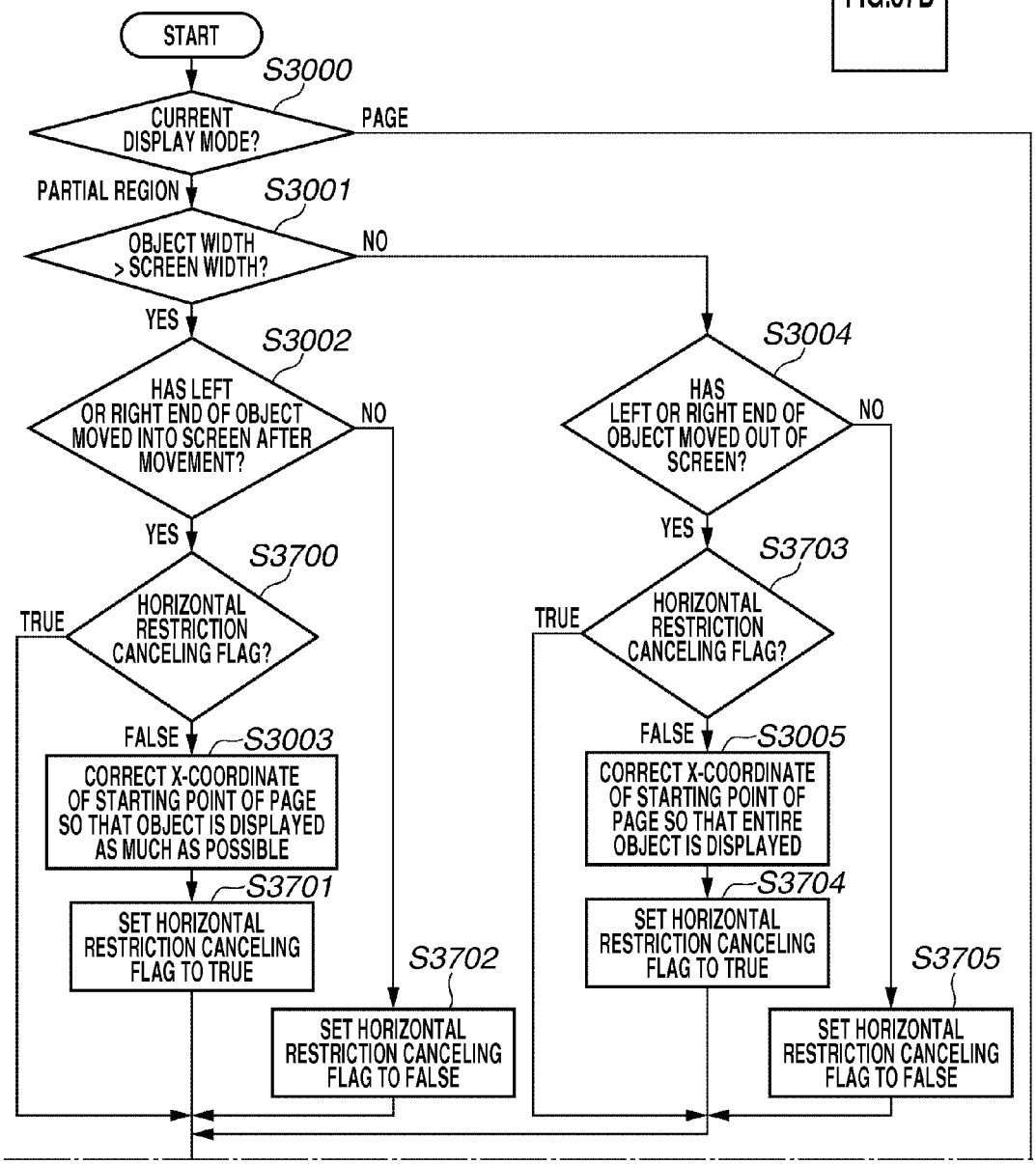
FIG. 37, which is composed of FIGS. 37A and 37B, is a flowchart illustrating moving range restriction processing according to a second exemplary embodiment of the present invention.
Figure 37B:
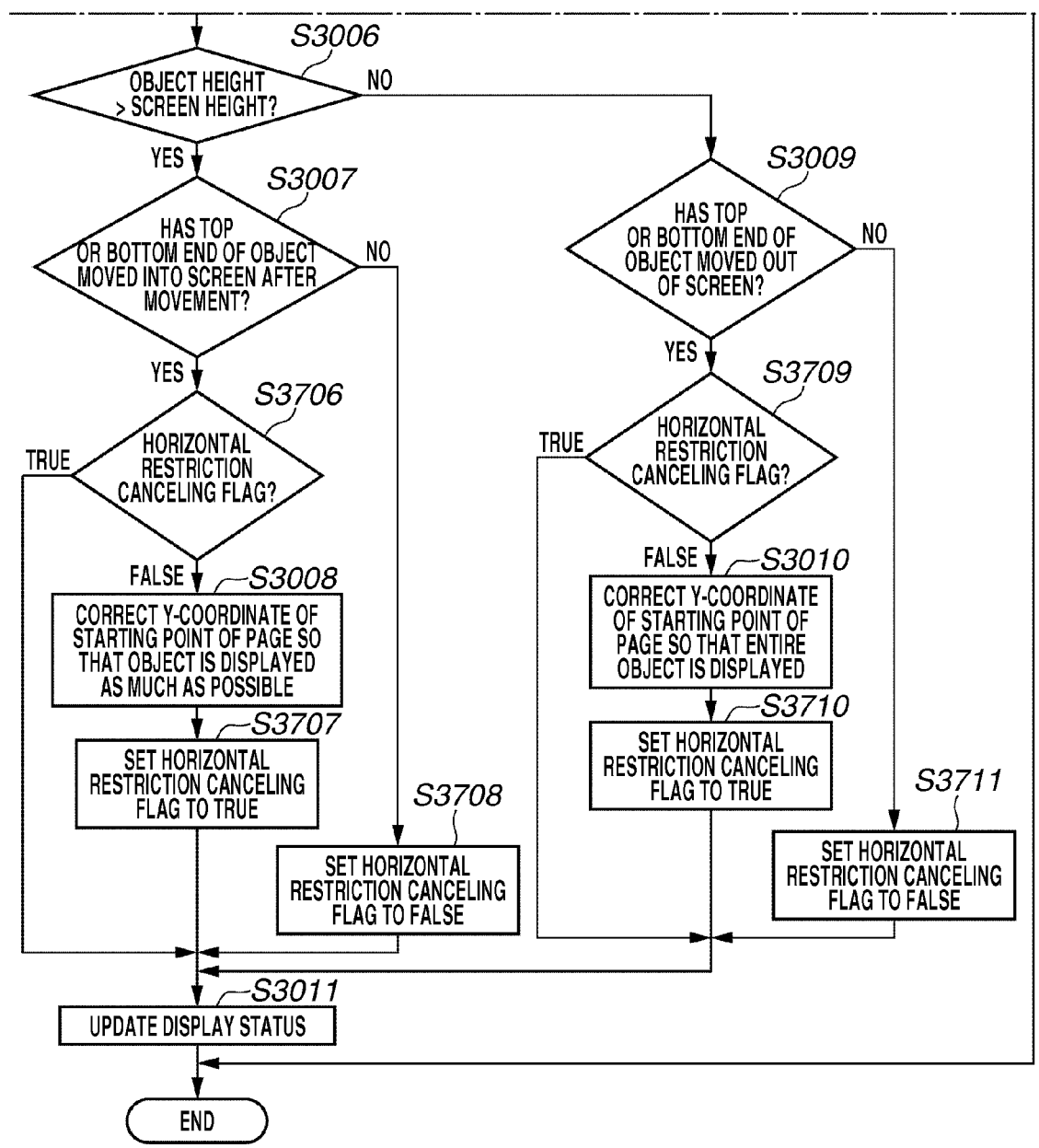

FIG. 37, which is composed of FIGS. 37A and 37B, is a flowchart illustrating the moving range restriction processing executed by the moving range restriction unit 2404 according to the second exemplary embodiment, which differs from the moving range restriction processing according to the first exemplary embodiment (FIG. 30) in using a horizontal restriction canceling flag and a vertical restriction canceling flag. The horizontal restriction canceling flag and the vertical restriction canceling flag are certainly initialized to FALSE, when a page and objects are read.

When the width of the relevant object is determined to be larger than the width of the screen (YES in step S3001) and when the left or right end of the relevant object is determined to have moved into the screen of the touch UI 1904 (YES in step S3002), the processing proceeds to step S3700. In step S3700, the moving range restriction unit 2404 checks the status of the horizontal restriction canceling flag. When the horizontal restriction canceling flag is determined to be TRUE in step S3700, the moving range restriction unit 2404 does not restrict the moving range of the relevant object, and the processing proceeds to step S3006. Otherwise, when the horizontal restriction canceling flag is determined to be FALSE in step S3700, then in step S3003, the moving range restriction unit 2404 once restricts the moving range of the relevant object, then in step S3701, the moving range restriction unit 2404 sets the horizontal restriction canceling flag to TRUE, and the processing proceeds to step S3006.

When the left or right end of the relevant object is determined not to have moved into the screen of the touch UI 1904 (NO in step S3002), then in step S3702, the moving range restriction unit 2404 sets the horizontal restriction canceling flag to FALSE, and the processing proceeds to step S3006.

When the width of the relevant object is determined not to be larger than the width of the screen (NO in step S3001) and when the left or right end of the relevant object is determined to have moved out of the screen of the touch UI 1904 (YES in step S3004), the processing proceeds to step S3703. In step S3703, the moving range restriction unit 2404 checks the status of the horizontal restriction canceling flag. When the horizontal restriction canceling flag is determined to be TRUE in step S3703, the moving range restriction unit 2404 does not restrict the moving range of the relevant object, and the processing proceeds to step S3006. Otherwise, when the horizontal restriction canceling flag is determined to be FALSE in step S3703, then in step S3005, the moving range restriction unit 2404 once restricts the moving range of the relevant object, then in step S3704, the moving range restriction unit 2404 sets the horizontal restriction canceling flag to TRUE, and the processing proceeds to step S3006. When the left or right end of the object is determined not to have moved out of the screen of the touch UI 1904 (NO in step S3004), then in step S3705, the moving range restriction unit 2404 sets the horizontal restriction canceling flag to FALSE, and the processing proceeds to step S3006.

When the height of the relevant object is determined to be larger than the height of the screen (YES in step S3006) and when the top or bottom end of the object is determined to have moved into the screen of the touch UI 1904 (YES in step S3007), the processing proceeds to step S3706. In step S3706, the moving range restriction unit 2404 checks the status of the vertical restriction canceling flag. When the vertical restriction canceling flag is determined to be TRUE in step S3706, the moving range restriction unit 2404 does not restrict the moving range of the relevant object, and the processing proceeds to step S3011. Otherwise, when the vertical restriction canceling flag is determined to be FALSE in step S3706, then in step S3008, the moving range restriction unit 2404 once restricts the moving range of the relevant object, then in step S3707, the moving range restriction unit 2404 sets the vertical restriction canceling flag to TRUE, and the processing proceeds to step S3011. When the top or bottom end of the object is determined not to have moved into the screen of the touch UI 1904 (NO in step S3007), then in step S3708, the moving range restriction unit 2404 sets the vertical restriction canceling flag to FALSE, and the processing proceeds to step S3011.

When the height of the relevant object is determined not to be larger than the height of the screen (NO in step S3006) and when the top or bottom end of the object is determined to have moved out of the screen of the touch UI 1904 (YES in step S3009), the processing proceeds to step S3709. In step S3709, the moving range restriction unit 2404 checks the status of the vertical restriction canceling flag. When the vertical restriction canceling flag is determined to be TRUE in step S3709, the moving range restriction unit 2404 does not restrict the moving range of the relevant object, and the processing proceeds to step S3011. Otherwise, when the vertical restriction canceling flag is determined to be FALSE in step S3709, then in step S3010, the moving range restriction unit 2404 once restricts the moving range of the relevant object, then in step S3710, the moving range restriction unit 2404 sets the vertical restriction canceling flag to TRUE, and the processing proceeds to step S3011. When the top or bottom end of the object is determined not to have moved out of the screen of the touch UI 1904 (NO in step S3009), then in step S3711, the moving range restriction unit 2404 sets the vertical restriction canceling flag to FALSE, and the processing proceeds to step S3011.

As described above, the present exemplary embodiment enables browsing a page by freely scrolling, enlarging, and reducing an object through the swipe and pinch-in/out operations, and, in the partial region display mode, displaying only a desired object in an easily viewable form according to its contents. The present exemplary embodiment further enables successively displaying suitable ranges in the page in a suitable order only by operating the "NEXT" and "PREVIOUS" buttons, allowing the user to easily read information in the page without performing delicate adjustment. When moving an object with the swipe operation in the partial region display mode, the present exemplary embodiment restricts the moving range of the relevant object based on end positions of the relevant object, allowing the user to easily recognize the range of the relevant object. Further, when the user instructs to move the relevant object again after the moving range thereof is once restricted, the object can be moved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-055003 filed Mar. 12, 2012, which is hereby incorporated by reference herein in its entirety.

What is claimed is:

1. An image display apparatus for displaying an image containing a plurality of objects, the image display apparatus comprising:
a memory; and
at least one processor, wherein the at least one processor functions as:
a determination unit configured to determine a display order for the plurality of objects contained in the image;
a setting unit configured to set one of the plurality of objects as a display target object and set a magnification according to at least a size of the display target object;
a magnification unit configured to change a magnification of an entirety of the image to the magnification set by the setting unit; and
a display control unit configured to perform control to display on a screen a part of the entire image magnified with the magnification changed by the magnification unit,
wherein the part of the entire image contains the display target object, and
wherein the display control unit is further configured to switch the display target object to an object that is a next display target object among the plurality of the objects contained in the image according to the display order determined by the determination unit; and
wherein the display control unit is further configured to cause, as a part of the entire image magnified by the magnification unit at the magnification set by the setting unit according to at least a size of the next display target object, a part that includes the next display target object to be displayed on the screen.

2. The image display apparatus according to claim 1, wherein, when the display target object has a text attribute, the setting unit sets the display magnification according to whether the display target object is in itemized form and whether the display target object is in vertical or horizontal writing.

3. The image display apparatus according to claim 1, wherein, when the display target object has a table attribute, the setting unit detects a header of the table, and sets the display magnification based on a position of the header.

4. The image display apparatus according to claim 1, wherein, when the display target object has an attribute other than text and table attributes, the setting unit sets the display magnification and the display position so that the entire display target object is displayed.

5. The image display apparatus according to claim 1, wherein the display control unit performs control to enlarge or reduce the image containing the display target object in response to pinch-out and pinch-in operations by a user.

6. The image display apparatus according to claim 1, wherein the at least one processor further functions as a moving range restriction unit configured to, when a user performs when a swipe operation for moving the display position of the image containing the display target object is received, restrict the movement of the display position of the display target object so that the display target object is displayed.

7. The image display apparatus according to claim 6, wherein, when a display size of the display target object is larger than the screen when the swipe operation for moving the display position of the image containing the display target object is received, the moving range restriction unit restricts the movement of the display position of the display target object so that the end of the display target object is aligned with the corresponding end of the screen, and
wherein, when the display size of the display target object is not larger than the screen when the user performs the swipe operation, the moving range restriction unit restricts the movement of the display position of the display target object so that the entire display target object is displayed.

8. The image display apparatus according to claim 6, wherein, when a first swipe operation for moving the display position of the image containing the display target object is received, the moving range restriction unit once restricts the movement of the display position of the display target object so that the display target object is displayed, and then cancels the restriction of the movement for a second swipe operation.

9. The image display apparatus according to claim 1, wherein, when displaying on the screen when the first display mode is specified the image containing the display target object based on the display magnification and the display position set by the setting unit, the display control unit performs control to highlight the display target object.

10. The image display apparatus according to claim 1, wherein, when one of a first instruction for displaying a next object and a second instruction for displaying a previous object is given, the setting unit sets the display magnification according to at least a size of either the next object or the previous object specified as the display target object according to the given instruction, and the display control unit performs control to display on the screen a part of the image containing the display target object based on the set display magnification.

11. The image display apparatus according to claim 1, wherein, when displaying the entire image is specified, the display control unit performs control to display the entire image.

12. The image display apparatus according to claim 11, wherein, when a user performs when the part of the entire image is displayed, a pinch-in operation for further reducing the display target object to a size smaller than that of the screen, the display control unit performs control to select the second display mode so that the entire image is displayed.

13. The image display apparatus according to claim 11, wherein, when a double-tap operation for an object in the image displayed when it is controlled to display the entire image, the display control unit performs control to display on the screen the image containing the display target object intending to display the object in a position where the double-tap operation has been performed.

14. The image display apparatus according to claim 1, wherein the determination unit is further configured to determine the display order for each of the plurality of objects contained in the image based on a result of an analysis performed on the plurality of objects.

15. The image display apparatus according to claim 14, wherein the result of the analysis is a hierarchic structure of the plurality of objects contained in the image.

16. The image display apparatus according to claim 1, wherein the switching of display target objects to be displayed on the screen, performed by the control of the display control unit, is executed based on an instruction from a user.

17. The image display apparatus according to claim 16, wherein the instruction from the user is input by a button being pressed by the user.

18. The image display apparatus according to claim 1, wherein the display control unit causes at least a starting point of the display target object out of the display target object to be displayed on the screen.

19. The image display apparatus according to claim 18, wherein the starting point, of the display target object, displayed on the screen by the control of the display control unit is set based on an attribute of the display target object.

20. A non-transitory computer-readable storage medium storing a computer program for causing a computer to function as each unit included in an image display apparatus, the program comprising:
a memory; and
at least one processor, wherein the at least one processor functions as
a determination unit configured to determine a display order for the plurality of objects contained in the image;
a setting unit configured to set one of the objects as a display target object and set a magnification according to at least a size of the display target object;
a magnification unit configured to change a magnification of an entirety of the to the magnification set by the setting unit;
a display control unit configured to perform control to display on a screen a part of the entire image magnified with the magnification changed by the magnification unit
wherein the part of the entire image contains the display target object, and
wherein the display control unit is further configured to switch to the target object to an object that is a next display target object among the plurality of objects contained in the image according to the display order determined by the determination unit; and
wherein the display control unit causes, as a part of the engine image magnified by the magnification unit at the magnification set by the setting unit according to at least a size of the next display target object, a part that includes the next display target object to be displayed on the screen.

21. A method for displaying an image containing a plurality of objects, the method comprising:
determining a display order for the plurality of objects contained in the image;
setting a magnification to at least a size of the display target object;
changing a magnification of an entire image containing a plurality of objects based on the display magnification set; and
performing control to display on a screen a part of an entire image magnified with the changed magnification,
wherein the part of the entire image contains the display target object, and
wherein the display target object is switched to an object that is a next display target object among the plurality of objects contained in the image according to the display order; and
wherein, as a part of the entire image magnified at the magnification set according to at least a size of the next display target object, a part that includes the next display target object is displayed on the screen.

22. The method according to claim 21, wherein the setting unit is further configured to set the display magnification based on a type of the display target object.

23. The method according to claim 21, wherein the setting unit is further configured to set the display position based on a type of the display target object.

24. The method according to claim 21, wherein the display control unit is further configured to perform control to apply a semi-transparent mask on the region surrounding the display target object.

25. The method according to claim 21, wherein a display order for each of the plurality of objects contained in the image is determined based on a result of an analysis performed on the plurality of objects.

26. The method according to claim 25, wherein the result of the analysis is a hierarch structure of the plurality of objects contained in the image.

27. The method according to claim 21, wherein the switching of display target objects to be displayed on the screen is executed based on an instruction from a user.

28. The image display apparatus according to claim 27, wherein the instruction from the user is input by a button on the screen being pressed by the user.

29. The image display apparatus according to claim 21, wherein at least a starting point of the display target object out of the display target object is caused to be displayed on the screen.

30. The image display apparatus according to claim 29, wherein the starting point of the display target object displayed on the screen is set based on an attribute of the display target object.

* * * * *